US012720576B2

(12) United States Patent
Liu et al.

(10) Patent No.: US 12,720,576 B2
(45) Date of Patent: Aug. 25, 2026

(54) PHYSICAL DOWNLINK CONTROL CHANNEL MONITORING FOR MULTICAST BROADCAST SERVICE

(71) Applicant: QUALCOMM Incorporated, San Diego, CA (US)

(72) Inventors: Le Liu, San Jose, CA (US); Kazuki Takeda, Tokyo (JP); Umesh Phuyal, San Diego, CA (US); Alberto Rico Alvarino, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 458 days.

(21) Appl. No.: 18/448,623

(22) Filed: Aug. 11, 2023

(65) Prior Publication Data

US 2025/0056577 A1 Feb. 13, 2025

(51) Int. Cl.

| | |
|---|---|
| ***H04W 72/30*** | (2023.01) |
| ***H04W 72/232*** | (2023.01) |
| ***H04W 76/20*** | (2018.01) |

(52) U.S. Cl.

CPC ......... *H04W 72/30* (2023.01); *H04W 72/232* (2023.01); *H04W 76/20* (2018.02)

(58) Field of Classification Search

CPC ........... H04W 72/1263; H04W 72/566; H04W 56/0005; H04W 72/54; H04W 56/003; H04L 5/1469; H04B 7/2643; H04B 7/2671

See application file for complete search history.

(56) References Cited

U.S. PATENT DOCUMENTS

| | | | | |
|---|---|---|---|---|
| 2019/0246254 | A1* | 8/2019 | Chatterjee | H04W 76/11 |
| 2022/0232403 | A1* | 7/2022 | Lee | H04W 24/08 |
| 2022/0311564 | A1* | 9/2022 | Sun | H04L 5/0026 |
| 2022/0322419 | A1 | 10/2022 | Jeon et al. | |
| 2022/0345920 | A1* | 10/2022 | Liu | H04W 24/08 |
| 2022/0361161 | A1* | 11/2022 | Wei | H04W 72/30 |
| 2023/0189295 | A1* | 6/2023 | Baek | H04W 4/06 370/312 |
| 2023/0309121 | A1* | 9/2023 | Wang | H04L 5/005 |

(Continued)

FOREIGN PATENT DOCUMENTS

| | | | | |
|---|---|---|---|---|
| WO | 2022087056 A1 | | 4/2022 | |
| WO | WO-2022147380 A1 | * | 7/2022 | H04W 68/02 |

(Continued)

OTHER PUBLICATIONS

International Search Report and Written Opinion—PCT/US2024/030953—ISA/EPO—Aug. 30, 2024.

*Primary Examiner* — Habte Mered

(74) *Attorney, Agent, or Firm* — Patterson + Sheridan, L.L.P.

(57) ABSTRACT

Certain aspects of the present disclosure provide techniques for physical downlink control channel (PDCCH) monitoring for multicast-broadcast service (MBS). A method of wireless communications by a wireless node includes obtaining signaling indicating one or more search space (SS) parameters including at least one of: a defined set of control channel element (CCE) aggregation levels or a quantity of one or more PDCCH candidates per CCE aggregation level; and monitoring for one or more PDCCHs scheduling communication via one or more MBS channels based on the one or more SS parameters.

30 Claims, 10 Drawing Sheets

(56) References Cited

U.S. PATENT DOCUMENTS

2023/0354331 A1* 11/2023 MolavianJazi ......... H04L 5/001
2023/0362959 A1* 11/2023 Latheef ................... H04W 4/06
2023/0371046 A1 11/2023 Babaei
2024/0032070 A1* 1/2024 Zhou ..................... H04W 72/30
2024/0049182 A1* 2/2024 Zhou ................... H04W 72/232
2024/0323959 A1* 9/2024 Sengupta ................ H04W 4/06
2025/0031276 A1 1/2025 Zhang et al.
2025/0168668 A1 5/2025 Wang
2025/0175983 A1* 5/2025 Yoshioka ................ H04W 4/06
2025/0193894 A1* 6/2025 Hu ............................ H04L 1/08

FOREIGN PATENT DOCUMENTS

WO WO-2022218326 A1 * 10/2022 ............ H04W 76/27
WO WO-2024130598 A1 * 6/2024 .............. H04W 4/06

* cited by examiner

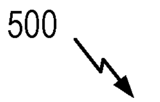
| CCE Aggregation LEvel | Number of Candidates |
|---|---|
| 4 | 4 |
| 8 | 2 |
| 16 | 1 |
*FIG. 5*

800 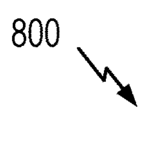

A METHOD FOR WIRELESS COMMUNICATION AT A NETWORK ENTITY

802
OUTPUT SIGNALING INDICATING ONE OR MORE SEARCH SPACE (SS) PARAMETERS INCLUDING AT LEAST ONE OF: A DEFINED SET OF CONTROL CHANNEL ELEMENT (CCE) AGGREGATION LEVELS OR A QUANTITY OF ONE OR MORE PHYSICAL DOWNLINK CONTROL CHANNEL (PDCCH) CANDIDATES PER CCE AGGREGATION LEVEL

804
OUTPUT FOR TRANSMISSION ONE OR MORE PDCCHS SCHEDULING COMMUNICATION VIA ONE OR MORE MULTICAST-BROADCAST SERVICE (MBS) CHANNELS BASED ON THE ONE OR MORE SS PARAMETERS

806
OUTPUT AT LEAST ONE OF: A SYSTEM INFORMATION BLOCK (SIB) OR AN RRC RELEASE MESSAGE CONFIGURING AN SS FOR THE PDCCH TO SCHEDULE COMMUNICATION VIA THE MULTICAST MCCH

808
OUTPUT A MBS CONTROL CHANNEL (MCCH), WHEREIN THE MCCH COMPRISES CONTROL INFORMATION THAT CONFIGURES A MAPPING OF PDCCH MONITORING OCCASIONS OF THE MULTICAST MTCH TO SYNCHRONIZATION SIGNAL BLOCKS (SSBS)

*FIG. 8*

PHYSICAL DOWNLINK CONTROL CHANNEL MONITORING FOR MULTICAST BROADCAST SERVICE

BACKGROUND

Field of the Disclosure

Aspects of the present disclosure relate to wireless communications, and more particularly, to techniques for physical downlink control channel (PDCCH) monitoring for multicast broadcast service (MBS).

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communication by a wireless node. The method includes obtaining signaling indicating one or more search space (SS) parameters including at least one of: a defined set of control channel element (CCE) aggregation levels or a quantity of one or more PDCCH candidates per CCE aggregation level; and monitoring for one or more PDCCHs scheduling communication via one or more MBS channels based on the one or more SS parameters.

Another aspect provides a method for wireless communication by a network entity. The method includes outputting for transmission signaling indicating one or more SS parameters including at least one of: a defined set of CCE aggregation levels or a quantity of one or more PDCCH candidates per CCE aggregation level; and outputting for transmission one or more PDCCHs scheduling one or more MBS channels based on the one or more SS parameters.

Other aspects provide: an apparatus operable, configured, or otherwise adapted to perform any one or more of the aforementioned methods and/or those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIG. 5 depicts a table of control channel element (CCE) aggregation levels and number of PDCCH candidates per CCE aggregation level.

FIG. 8 depicts a method for wireless communications by a network entity.

DETAILED DESCRIPTION

Aspects of the present disclosure provide apparatuses, methods, processing systems, and computer-readable mediums for monitoring PDCCH scheduling MBS channels. Some aspects relate to monitoring for PDCCH scheduling MBS service, such as PDCCH for MBS broadcast of a MBS control channel (MCCH) or a MBS traffic channel (MTCH). Some aspects relate to monitoring for PDCCH scheduling MBS broadcast. Some aspects related to monitoring for PDCCH scheduling MBS multicast. Some aspects relate to monitoring for PDCCH scheduling MBS while in a radio resource control (RRC) inactive mode.

According to certain aspects, for monitoring for PDCCH scheduling broadcast MCCH and/or broadcast MTCH, assumptions for restrictions on the search space are provided. In some aspects, the PDCCH is monitored in a Type 0B-PDCCH common search space (CSS). In some aspects, the assumed restrictions are aggregation levels and number of PDCCH candidates per aggregation level.

According to certain aspects, for monitoring for PDCCH scheduling multicast MCCH and/or MTCH in the RRC inactive mode, the assumptions for restrictions on the search space are provided.

According to certain aspects, for monitoring for PDCCH scheduling multicast MTCH in the RRC inactive mode, a mapping of synchronization signal blocks (SSBs) to MTCH PDDCH occasions is configured by an RRC release message or a system information block (SIB).

According to certain aspects, for monitoring for PDCCH scheduling multicast MTCH in the RRC inactive mode, the PDCCH is monitored in a Type 0/0B-PDCCH CSS or a Type-3-PDCCH CSS.

According to certain aspects, monitoring for PDCCH scheduling MBS multicast MTCH in the RRC inactive mode follows monitoring as in an RRC connected mode until an RRC release message or a SIB is received.

Aspects of the disclosure for monitoring for PDCCH scheduling MCCH and MTCH may allow reduced hardware, software, and/or firmware complexity of a user equipment (UE) and network entity and/or reduced power consumption.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

Figure 1:
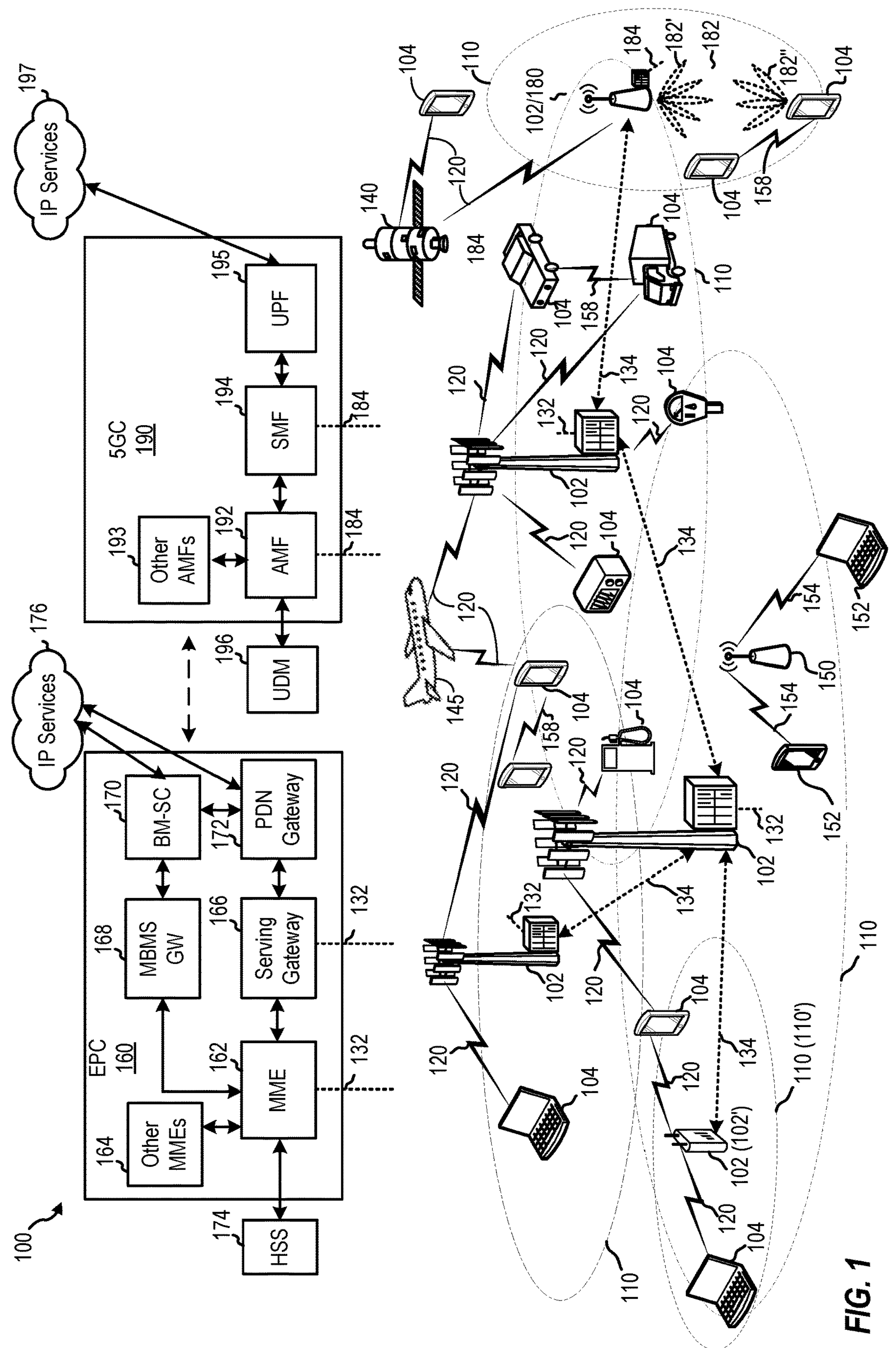
FIG. 1 depicts an example wireless communications network.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
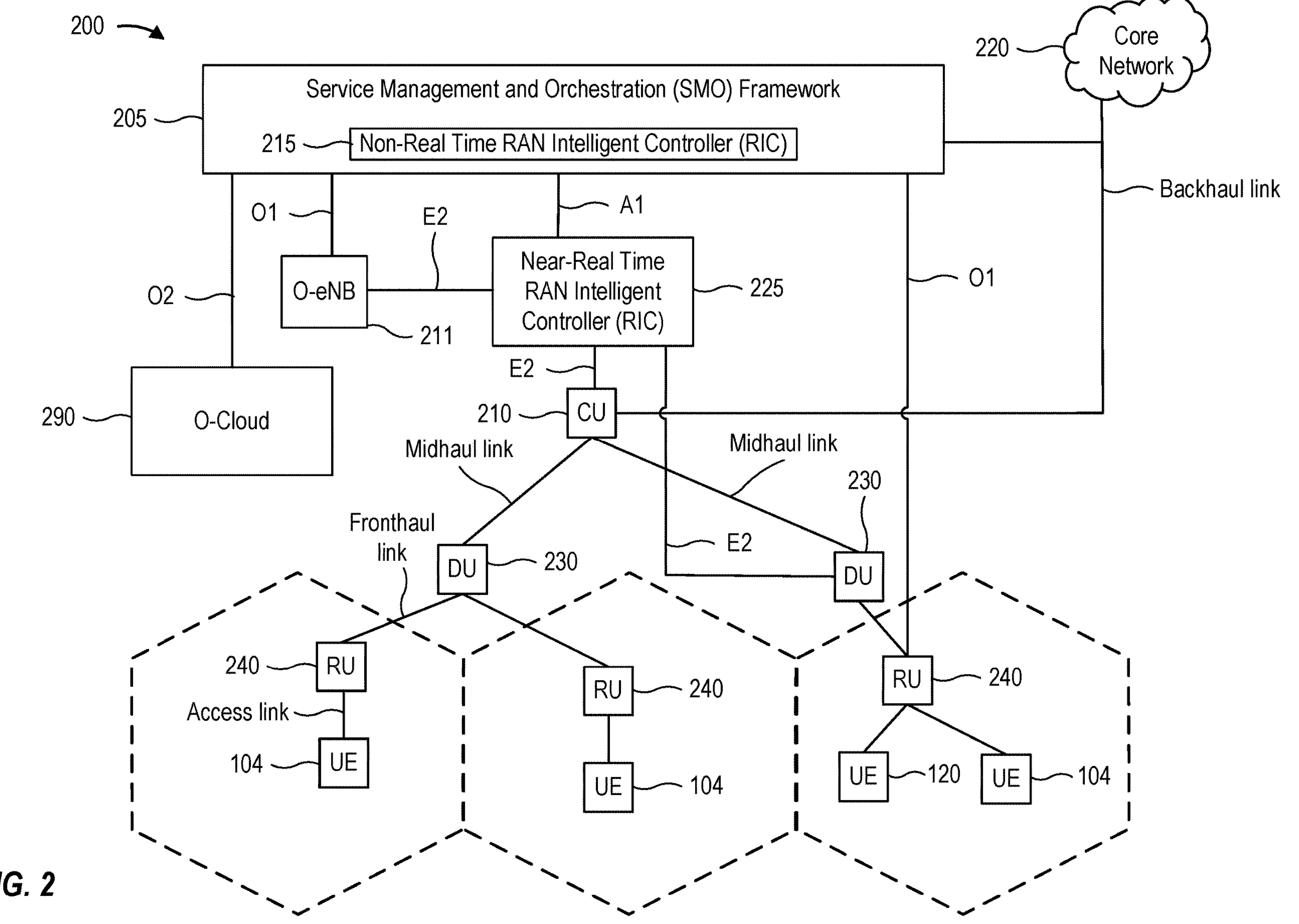
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-71,000 MHz, which is sometimes referred to (interchangeably) as a "millimeter wave" ("mmW" or "mmWave"). In some cases, FR2 may be further defined in terms of sub-ranges, such as a first sub-range FR2-1 including 24,250 MHz-52,600 MHz and a second sub-range FR2-2 including 52,600 MHz-71,000 MHz. A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit—User Plane (CU-UP)), control plane functionality (e.g., Central Unit—Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via 01) or via creation of RAN management policies (such as A1 policies).

Figure 3:
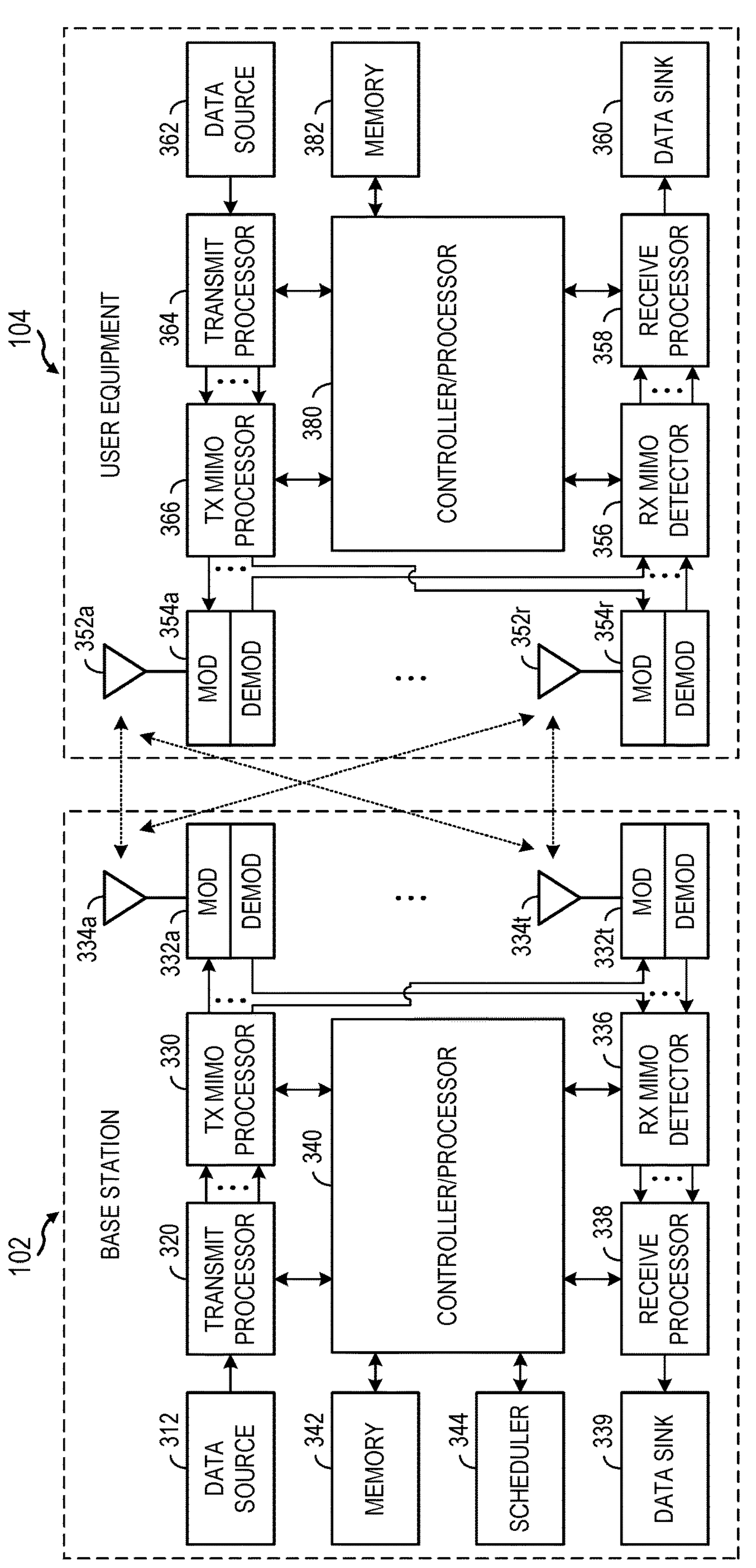
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334*a-t* (collectively 334), transceivers 332*a-t* (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a*-332*t*. Each modulator in transceivers 332*a*-332*t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a*-332*t* may be transmitted via the antennas 334*a*-334*t*, respectively.

In order to receive the downlink transmission, UE 104 includes antennas 352*a*-352*r* that may receive the downlink signals from the BS 102 and may provide received signals to the demodulators (DEMODs) in transceivers 354*a*-354*r*, respectively. Each demodulator in transceivers 354*a*-354*r* may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354*a*-354*r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354*a*-354*r* (e.g., for SC-FDM), and transmitted to BS 102.

At BS 102, the uplink signals from UE 104 may be received by antennas 334*a-t*, processed by the demodulators in transceivers 332*a*-332*t*, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332*a-t*, antenna 334*a-t*, and/or other aspects described herein. Similarly, "receiving" may refer to various mechanisms of obtaining data, such as obtaining data from antennas 334*a-t*, transceivers 332*a-t*, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354*a-t*, antenna 352*a-t*, and/or other aspects described herein. Similarly, "receiving" may refer to various mechanisms of obtaining data, such as obtaining data from antennas 352*a-t*, transceivers 354*a-t*, RX MIMO detector 356, controller/processor 380, receive processor 358, memory 382, and/or other aspects described herein.

In some aspects, one or more processors may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figures 4A, 4B, 4C, 4D:
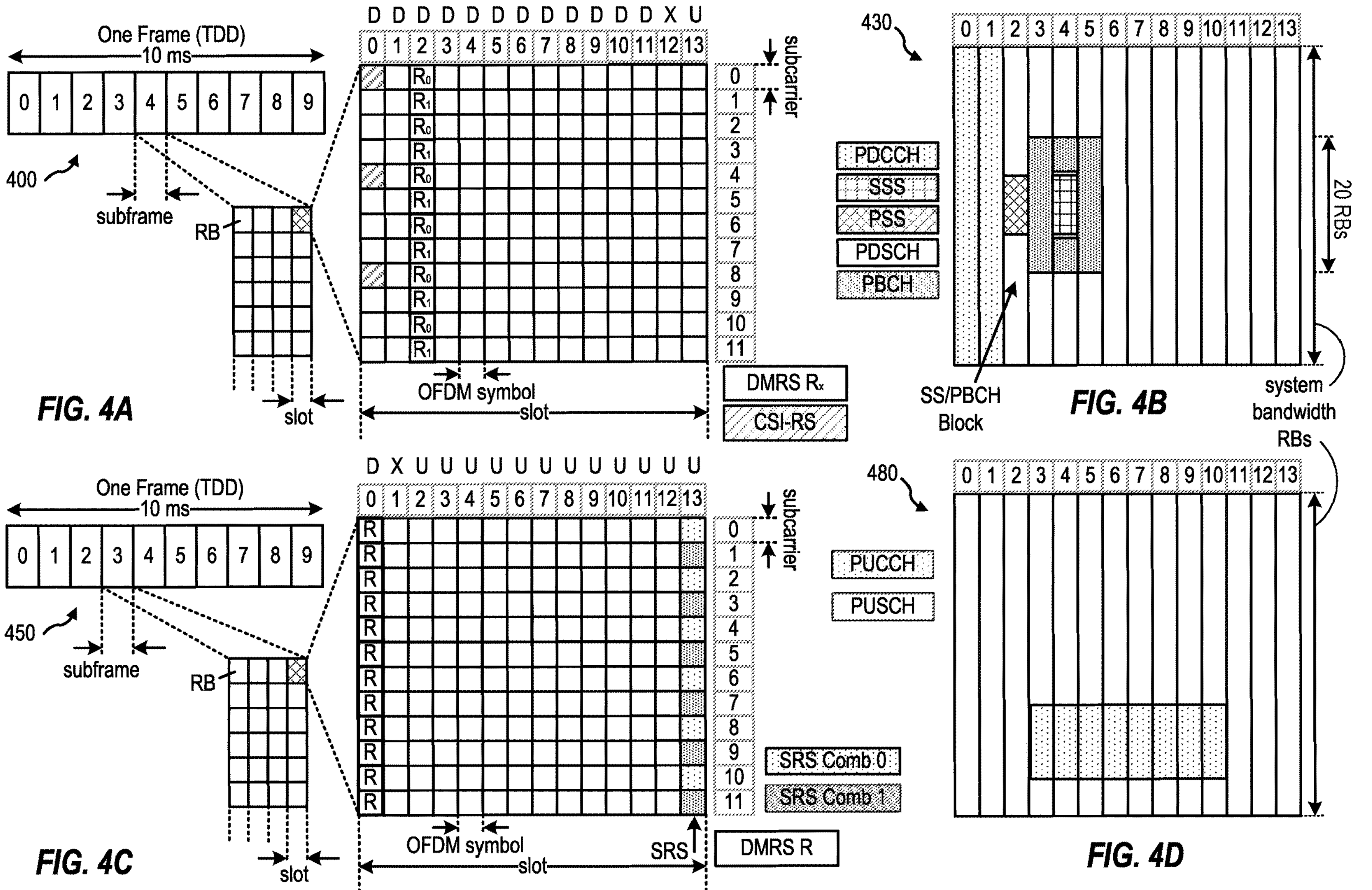
FIGS. 4A, 4B, 4C, and 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies (μ) 0 to 6 allow for 1, 2, 4, 8, 16, 32, and 64 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to 21×15 kHz, where μ is the numerology 0 to 6. As such, the numerology μ=0 has a subcarrier spacing of 15 kHz and the numerology p=6 has a subcarrier spacing of 960 kHz. The symbol length/duration is inversely related to the subcarrier spacing. FIGS. 4A, 4B, 4C, and 4D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 as.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Aspects Related to Monitoring for PDCCH Scheduling MBS

Aspects of the present disclosure provide apparatuses, methods, processing systems, and computer-readable mediums for monitoring for PDCCH scheduling MBS. Some aspects relate to monitoring for PDCCH scheduling MBS broadcast, such as for PDCCH scheduling broadcast of a MCCH or a MTCH. Some aspects relate to monitoring for PDCCH scheduling multicast of the MCCH or the MTCH. Some aspects relate to monitoring for PDCCH scheduling MBS while in a RRC inactive mode.

MBS is a service that enable the efficient distribution of multimedia (e.g., video, audio, and other multimedia) content to a large number of users. MBS efficiently delivers content, such as video, audio, and other multimedia data, to multiple recipients simultaneously. MBS may be suitable for scenarios like mobile TV, live event streaming, software updates, emergency alerts, and the like. The MTCH and MCCH enable MBS. Broadcast MTCH and MCCH may be broadcasted to all users within a cell or coverage area. Multicast MTCH and MCCH may be multicast to a group of users that have subscribed to the MBS multimedia content.

MTCH may be broadcast to carry the multimedia content to users. In an example, broadcast MTCH may be a radio channel shared among all user receiving the same multimedia data, within a specific cell or coverage area. MTCH may be multicast transmitted to a specific group of users that have expressed interest (e.g., subscribed to a multicast group) in receiving the multimedia data.

MCCH is used to carry control information related to the MBS service. The control information may include details about the content being broadcasted in the MTCH, scheduling information, service notifications, and other signaling. The MCCH may be broadcast to all devices within the cell or coverage area that are capable of receiving the broadcast MCCH. MCCH may be multicast transmitted to a specific group of users that have expressed interest (e.g., subscribed to a multicast group) in receiving the multimedia data.

Monitoring for PDCCH Scheduling Broadcast MBS:

In some aspects, a set of PDCCH candidates for a UE to monitor is defined in terms of PDCCH search space sets. A search space set can be a CSS set or a user specific search space (USS) set. In certain systems, such as 3GPP Release-17 NR systems, blind detection of PDCCH detection consumes significant UE power and contributes to UE complexity. To reduce the number of PDCCH candidates for blind detection, the control channel element (CCE) aggregation levels and the maximum number of PDCCH candidates per CCE aggregation level may be restricted when monitoring for PDCCH.

In certain systems, a Type0B-PDCCH CSS is introduced for monitoring PDCCH scheduling broadcast MCCH and MTCH. According to certain aspects, to reduce the number of PDCCH candidates for blind detection of the PDCCH scheduling MBS channels, the CCE aggregation levels and maximum number of PDCCH candidates per CCE aggregation level may be restricted when monitoring the Type0B-PDCCH CSS. FIG. 5 is a table 500 depicting example CCE aggregation levels and number of candidates per CCE aggregation level. In some aspects, a UE assumes the CCE aggregation levels and maximum number of candidates per CCE aggregation level when performing blind detection to monitor the Type0/0B-PDCCH for broadcast MCCH and/or MTCH.

In some aspects, a control resource set (CORESET) accommodates multiples of the aggregation level. Aggregation level indicates how many CCEs are allocated for a PDCCH. An aggregation level includes N CCEs. Each CCE includes a number of resource element groups (REGs), for example 6 REGs. Each REG includes a number of resource blocks (RBs) and OFDM symbols (e.g., 1 RB and 1 symbol per REG). In some aspects, a set of PDCCH candidates for a UE to monitor is defined in terms of PDCCH search space sets. A search space set can be a CSS set or a UE specific search space (USS) set. A UE monitors PDCCH candidates in one or more of the following search spaces sets.

According to certain aspects, for a common frequency resource (CFR) for MBS broadcast, if a UE is not provided searchSpaceMCCH or searchSpaceMTCH for Type0B-PDCCH CSS set, the UE does not monitor the Type0B-PDCCH CSS set on the MBS CFR. The CCE aggregation levels and the number of PDCCH candidates per CCE aggregation level for Type0B-PDCCH CSS are given in a configured restriction (e.g., the table 500).

In some aspects, the parameters searchSpaceMCCH and searchSpaceMTCH are provided in the IE PDCCHConfigCommon. In some aspects, the parameter searchSpaceMCCH provides the ID of the search space for MCCH. If the field is absent, the UE does not receive MCCH in this BWP. In some aspects, the parameter searchSpaceMTCH provides the ID of the search space for MTCH of MBS broadcast. In some aspects, if the field is absent, the UE applies searchSpaceMCCH also for MTCH.

According to certain aspects, the UE assumes the restricted set of CCE aggregation levels and the number of candidates per CCE aggregation level for monitoring both Type0B-PDCCH CSS for PDCCH scheduling MBS broadcast MCCH and Type0B-PDDCH CSS for PDCCH scheduling MBS broadcast MTCH (e.g., the UE is configured both searchSpaceMCCH and searchSpaceMTCH).

According to certain aspects, the UE assumes the restricted set of CCE aggregation levels and the number of candidates per CCE aggregation level for monitoring Type0B-PDCCH CSS for PDCCH scheduling MBS broadcast MCCH (e.g., configured for searchSpaceMCCH), but not Type0B-PDDCH CSS for PDCCH scheduling MBS broadcast MTCH (e.g., configured for searchSpaceMTCH). Accordingly, there is no restriction on the CCE aggregation levels and the number of PDCCH candidates per CCE aggregation level for the Type0B-PDCCH CSS for broadcast MTCH.

According to certain aspects, the UE assumes the restricted set of CCE aggregation levels and the number of candidates per CCE aggregation level for monitoring Type0B-PDCCH CSS for PDCCH scheduling broadcast MTCH (e.g., configured for searchSpaceMTCH), but not for monitoring the Type0B-PDDCH CSS for PDCCH scheduling broadcast MCCH (e.g., configured for searchSpaceMCCH). Accordingly, there is no restriction on the CCE aggregation levels and the number of PDCCH candidates per CCE aggregation level for the Type0B-PDCCH CSS for PDCCH scheduling broadcast MCCH.

According to certain aspects, the UE does not assume the restricted set of CCE aggregation levels and the number of candidates per CCE aggregation level for monitoring either Type0B-PDCCH CSS for PDCCH scheduling broadcast MTCH (e.g., configured for searchSpaceMTCH) or for Type0B-PDDCH CSS for PDCCH scheduling broadcast MCCH (e.g., configured for searchSpaceMCCH). Accordingly, there is no restriction on the CCE aggregation levels and the number of PDCCH candidates per CCE aggregation level for the Type0B-PDCCH CSS for PDCCH scheduling broadcast MCCH and the Type0B-PDCCH CSS for PDCCH scheduling broadcast MTCH.

According to certain aspects, a new parameter (e.g., nrofCandidates-MBS) is provided to the UE to indicate the max number of PDCCH candidates for the configured aggregation level(s) for MBS. In some aspects, the new parameter indicates the number of PDCCH candidates specifically for DCI format 4_0 for a configured aggregation level. The new parameter may be provided in a SearchSpace IE that defines how and/or where to search for PDCCH candidates.

In some aspects, an RRC information element (IE) defines how and/or where to search for PDCCH candidates. Each search space is associated with one CORESET (e.g., ControlResourceSet). For a scheduled secondary cell (SCell) in the case of cross carrier scheduling, except for a field nrofCandidates, all the optional fields are absent (regardless of their presence conditions). For a scheduled special cell (SpCell) in the case of the cross carrier scheduling, if the search space is linked to another search space in the scheduling SCell, all the optional fields of this search space in the scheduled SpCell are absent (regardless of their presence conditions) except for nrofCandidates.

According to certain aspects, the UE may be configured to monitor a Type3-PDCCH CSS for MBS broadcast MCCH/MTCH on SCell by unicast RRC signaling for a UE in RRC_CONNECTED mode. For the MBS broadcast on SCell, UE may assume the restricted set of CCE aggregation levels and the number of candidates per CCE aggregation level for monitoring either Type3-PDCCH CSS for MBS broadcast MTCH (e.g., configured for searchSpaceMTCH) or for Type3-PDDCH CSS for MBS broadcast MCCH (e.g., configured for searchSpaceMCCH). The CCE aggregation levels and the number of PDCCH candidates per CCE aggregation level for Type3-PDCCH CSS for MBS broadcast MCCH and/or MTCH on SCell may be given in a configured restriction (e.g., the table 500). Alternatively, there is no restriction on the CCE aggregation levels and the number of PDCCH candidates per CCE aggregation level for the Type3-PDCCH CSS for broadcast MCCH and the Type3-PDCCH CSS for broadcast MTCH on SCell.

Monitoring for PDCCH Scheduling Multicast MBS Channels in RRC_INACTIVE:

When the UE is powered up, the UE is in a disconnected/idle mode. The UE can perform initial access or connection establishment with a network to move to an RRC_CONNECTED mode. The UE can transit between the RRC_CONNECTED mode and an RRC_INACTIVE mode. For example, if there is no activity from the UE for a duration, the UE can suspend its session by moving to the RRC_INACTIVE mode and can resume its session by returning to the RRC_CONNECTED mode. In the RRC_CONNETED mode, the UE can monitor for PDCCH scheduling multicast MTCH. When the UE transits into the RRC_INACTIVE mode, the UE may be able to keep monitoring for PDCCH scheduling multicast MTCH. In addition, for the UE in the RRC_INACTIVE mode, multicast MCCH is configured and UE can monitor for PDCCH scheduling multicast MCCH as well.

In some aspects, PDCCH scheduling multicast MTCH uses a DCI format 4_1 and/or a DCI format 4_2 for dynamic scheduling of multicast MTCH in RRC_INACTIVE mode. In some aspects, slot-level physical downlink shared channel (PDSCH) repetition is used for multicast MTCH PDSCH reception in the RRC_INACTIVE mode.

In some aspects, PDCCH scheduling multicast MCCH uses a DCI format 4_0 for scheduling of multicast MCCH in RRC_INACTIVE mode.

In some aspects, separate CSS(es) are configured for the PDCCH scheduling multicast MCCH and the multicast MTCH in the RRC_INACTIVE mode.

According to certain aspects, Type0B-PDCCH CSS is used for PDCCH monitoring for multicast MCCH in RRC_INACTIVE mode. In some aspects, the Type0B-PDCCH CSS with beam sweeping is used for PDCCH scheduling multicast MCCH in the RRC_INACTIVE mode. In some aspects, the Type0B-PDCCH CSS is used for monitoring PDCCH scheduling multicast MCCH in RRC_INACTIVE mode is configured for searchSpaceMCCH-Multicast.

In some aspects, a restriction on the CCE aggregation levels and the number of candidates per CCE aggregation level is used for the monitoring PDCCH scheduling multicast MCCH in RRC_INACTIVE. In some aspects, the UE assumes the CCE aggregation levels and the number of candidates per CCE aggregation level in the Table 500 depicted in FIG. 5.

According to certain aspects, Type0B-PDCCH CSS is used for monitoring for PDCCH scheduling multicast MTCH in RRC_INACTIVE mode. In some aspects, the Type0B-PDCCH CSS with beam sweeping is used for monitoring for PDCCH scheduling multicast MTCH in the RRC_INACTIVE mode. In some aspects, the Type0B-PDCCH CSS is used for monitoring for PDCCH scheduling multicast MTCH in RRC_INACTIVE mode is configured for searchSpaceMTCH-Multicast.

In some aspects, the searchSpaceMTCH_Multicast may be configured by an RRCRelease message or a SIB message for multicast reception in RRC_INACTIVE. In some aspects, the searchSpaceMTCH_Multicast for multicast MTCH is configured separately from the searchSpaceMTCH for broadcast MTCH.

According to certain aspects, SSBs may be transmitted by the network using beam sweeping and the SSBs map to MCCH or MTCH PDCCH occasions. In some aspects, the beam sweeping for the Type0B-PDCCH CSS for PDCCH monitoring for multicast MTCH in RRC_INACTIVE mode is configured separately from the beam sweeping for the Type0B-PDCCH CSS is used for monitoring for PDCCH scheduling multicast MTCH in RRC_INACTIVE mode.

According to certain aspects, the multicast MTCH PDCCH occasions to SSB mapping for multicast reception in RRC_INACTIVE is configured by the MCCH message (MCCH-Message). In some aspects, the MCCH message is a set of RRC messages sent from the network to the UE on the MCCH logical channel. An example format of the MCCH-Message is shown below:

```
-- ASN1START
-- TAG-MCCH-MESSAGE-START
  MCCH-Message-r17 ::= SEQUENCE {
        message                          MCCH-MessageType-r17
}
MCCH-MessageType-r17 ::= CHOICE {
        c1                                    CHOICE {
          mbsBroadcastConfiguration-r17          MBSBroadcastConfiguration-r17,
          spare 1                                NULL
        },
      messageClassExtension              SEQUENCE { }
}
MCCH-MessageType-Multicast-r18 ::= CHOICE {
        c1                                    CHOICE {
          mbsMulticastConfiguration-r18          MBSMulticastConfiguration-r18,
          spare1                               NULL
    },
  messageClassExtension                    SEQUENCE { }
```

In some aspects, the multicast MTCH PDCCH occasions to SSB mapping for multicast reception in RRC_INACTIVE is configured by an IE (e.g., MTCH-SSB-Mapping WindowList-Multicast) in an MBS multicast configuration MCCH message (e.g., mbsMulticastConfiguration-r18). In some aspects, the MBS multicast configuration message contains control information applicable for MBS multicast services. An example format of the MBSMulticastConfiguration is shown below:

```
-- ASN1START
-- TAG-MBSMULTICASTCONFIGURATION-START
MBSMulticastConfiguration-r18 : : =   SEQUENCE {
```

-continued

```
        criticalExtensions                  CHOICE {
           mbsMulticastConfiguration-r18         MBSMulticastConfiguration-r18-IEs,
           criticalExtensionsFuture              SEQUENCE { }
        }
}
MBSMulticastConfiguration-r18-IEs : : =   SEQUENCE {
     mbs-SessionInfoList-Multicast-r18      MBS-SessionInfoList-r17         OPTIONAL,
-- Need R
     mbs-NeighbourCellList-Multicast-r18    MBS-NeighbourCellList-r17         OPTIONAL,
-- Need S
     drx-ConfigPTM-List-Multicast-r18       SEQUENCE (SIZE (1..maxNrofDRX-
ConfigPTM-r17)) OF DRX-ConfigPTM-r17                                   OPTIONAL,
-- Need R
     pdsch-ConfigMTCH-Multicast-r17         PDSCH-ConfigMulticast-r17          OPTIONAL,
-- Need S
  mtch-SSB-MappingWindowList-Multicast-r18   MTCH-SSB-MappingWindow
List-r17                                                            OPTIONAL,
  -- Need R
  lateNonCriticalExtension               OCTET STRING                 OPTIONAL,
  nonCriticalExtension                   SEQUENCE { }                   OPTIONAL
}
-- TAG-MBSMULTICASTCONFIGURATION-STOP
-- ASN1STOP
```

In some aspects, the multicast MTCH PDCCH occasions to SSB mapping for multicast reception in RRC_INACTIVE are configured with related period and offset parameters. An example format of the MTCH-SSB-MappingWindowList-Multicast IE is shown below:

```
-- ASN1START
-- TAG-MTCH-SSB-MAPPINGWINDOWLIST-START
MTCH-SSB-MappingWindowList-r17   : : =   SEQUENCE (SIZE (1..maxNrofMTCH-
SSB-MappingWindow-r17)) OF MTCH-SSB-MappingWindowCycleOffset-r17
MTCH-SSB-MappingWindowCycleOffset-r17   : : =   CHOICE {
   ms10                          INTEGER(0..9),
   ms20                          INTEGER(0..19),
   ms32                          INTEGER(0..31),
   ms64                          INTEGER(0..63),
   ms128                         INTEGER(0..127),
   ms256                         INTEGER(0..255)
}
-- TAG-MTCH-SSB-MAPPINGWINDOWLIST-STOP
-- ASN1STOP
```

In some aspects, a parameter (e.g., MTCH-SSB-MappingWindowCycleOffset) in the IE configuring the multicast MTCH PDCCH occasions to SSB mapping for multicast reception in RRC_INACTIVE indicates the cycle and offset for multicast MTCH PDCCH occasions to SSB mapping. In some aspects, values for the cycle and offset are in unit of ms. For example, ms10 corresponds to cycle of 10 ms with corresponding offset between 0 and 9 ms, value ms20 corresponds to cycle of 20 ms with corresponding offset between 0 and 19 ms, and so on for the values ms32, ms64, ms128, and ms256. In some aspects, the mapping window starts at a subframe in a system frame number (SFN) where [(SFN number×10)+subframe number] modulo (cycle)=offset.

In some aspects, PDCCH monitoring occasions for MTCH in a mapping window which are not overlapping with uplink (UL) symbols (e.g., determined according to a signaled parameter tdd-UL-DL-ConfigurationCommon) are sequentially numbered starting from 1 in the mapping window. For example, the $[x \times N+K]^{th}$ PDCCH monitoring occasion for multicast MTCH in this mapping window corresponds to the $K^{th}$ transmitted SSB, where x=0, 1, . . . X−1, K=1, 2, . . . N, N is the number of actual transmitted SSBs determined according to ssb-PositionsInBurst in SIB1 and X is equal to CEIL(number of PDCCH monitoring occasions in MTCH to SSB mapping transmission window/N). The actual transmitted SSBs are sequentially numbered from one in ascending order of their SSB indexes.

Monitoring for PDCCH Scheduling Multicast MTCH in RRC_CONNECTED AND RRC_INACTIVE:

A UE may be capable of multicast reception both in the RRC_CONNECTED mode and in the RRC_INACTIVE mode. In the RRC_CONNECTED mode, the UE may receive a configuration of a search space for monitoring PDCCH for multicast in the RRC_CONNECTED mode. In some aspects, the configuration is received in a signaled parameter (e.g., SearchSpace) in a message (e.g., a pdcch-ConfigMulticast IE).

When the UE transitions from the RRC_CONNECTED mode to the RRC_INACTIVE mode, the UE may receive a configuration of a search space for monitoring PDCCH for multicast in the RRC_INACTIVE mode. For example, the UE may receive a signaled parameter (e.g., searchSpaceMTCH_Multicast) configuring the search space for monitoring for PDCCH scheduling multicast MTCH in the RRC_INACTIVE mode. In some aspects, the signaled parameter is received and/or in a radio resource control (RRC) release message or in a system information block (SIB).

According to certain aspects, if the signaled parameter (e.g., searchSpaceMTCH_Multicast) with the search space configuration for monitoring PDCCH for multicast in the RRC_INACTIVE mode is not provided in the RRC release message, but is provided in the SIB, the UE continues monitoring the search space configured for monitoring for PDCCH scheduling multicast in the RRC_CONNECTED mode (e.g., configured by SearchSpace in pdcch-Config-Multicast IE) until the multicast MCCH change notification broadcast in the SIB is received.

According to certain aspects, if the signaled parameter (e.g., searchSpaceMTCH_Multicast) with the search space configuration for monitoring PDCCH for multicast in the RRC_INACTIVE mode is provided in the RRC release message, the UE continues starts monitoring the search space provided in the RRC release message for PDCCH scheduling multicast in the RRC_INACTIVE mode until a multicast MCCH change notification broadcast in the SIB is received.

Monitoring Type0/0B-PDCCH CSS for PDCCH Scheduling Multicast MTCH in RRC_INACTIVE:

According to certain aspects, Type0/0B-PDCCH CSS with beam sweeping is used for monitoring for PDCCH scheduling multicast MTCH in RRC_INACTIVE.

In certain systems, such as 3GPP Release-17 5G NR systems, the Type0 and Type 0B (e.g., sometimes denoted as Type0/0B) CSS supports DCI format 4_0 for broadcast MCCH and broadcast MTCH. The DCI format 40 may include a frequency domain resource assignment, a time domain resource assignment (e.g., 4 bits), a virtual resource block (VRB) to physical resource block (PRB) mapping (e.g., 1 bit), a modulation and coding scheme (e.g., 5 bits), a redundancy version (e.g., 2 bits), an MCCH change notification (e.g., 2 bits), and reserved bits (e.g., 14 bits).

In some aspects, for the multicast MCCH, the Type0/0B-PDCCH CSS uses the DCI format 4_0. According to certain aspects, however, the Type0/0B-PDCCH CSS with beam sweeping for the multicast MTCH (e.g., configured by searchSpaceMTCH_Multicast) uses the DCI format 4_1. The DCI format 40 may include a frequency domain resource assignment, a time domain resource assignment (e.g., 4 bits), a virtual resource block (VRB) to physical resource block (PRB) mapping (e.g., 1 bit), a modulation and coding scheme (e.g., 5 bits), a new data indicator (e.g., 1 bit), a redundancy version (e.g., 2 bits), a hybrid automatic repeat request (HARQ) process number (e.g., bits), a downlink assignment index (e.g., 2 bits), a physical uplink control channel (PUCCH) resource indicator (e.g., 3 bits), a physical downlink shared channel (PDSCH)-to-HARQ feedback timing indicator (e.g., 3 bits), and reserved bits (e.g., 3 bits).

In some aspects, a UE monitors PDCCH candidates in a Type0-PDCCH CSS set on the primary cell of a master cell group (MCG). In some aspects, the Type0-PDCCH is configured by a parameter a value of a parameter of the common search space #0 (e.g., searchSpaceZero with searchSpaceID=0) for the MBS multicast MCCH (e.g., for searchSpaceMCCH_Multicast) or the MBS multicast MTCH (e.g., for searchSpaceMTCH_Multicast). In some aspects, the Type0-PDCCH for MBS multicast MCCH or for MBS multicast MTCH uses the DCI format 4_0 with the cyclic redundancy check (CRC) scrambled by an MCCH radio network temporary identification (MCCH-RNTI) or a group RNTI (G-RNTI) for multicast.

In some aspects, a UE monitors PDCCH candidates in a Type0B-PDCCH CSS set. In some aspects, the Type0B-PDCCH CSS set is configured for a multicast MCCH (e.g., for searchSpaceMCCH_Multicast) for the DCI format 4_0 with a CRC scrambled by an MCCH-RNTI for multicast (e.g., MCCH-RNTI-Multicast) on the primary cell of the MCG. In some aspects, the Type0B-PDCCH CSS set is configured for a multicast MTCH (e.g., for searchSpaceMTCH_Multicast) for the DCI format 4_1 with a CRC scrambled by a G-RNTI for multicast on the primary cell of the MSG.

In some aspects, the RNTI used to scramble the CRC of the DCI is configured via a signaled parameter (e.g., the parameter MBS-SessionInfo).

According to certain aspects, a restriction on the CCE aggregation levels and the number of candidates per CCE aggregation level is used for the Type 0/0B-PDCCH CSS monitoring for the PDCCH scheduling multicast MTCH in RRC_INACTIVE. In some aspects, the UE assumes the CCE aggregation levels and the number of candidates per CCE aggregation level in the Table 500 depicted in FIG. 5.

Type3-PDCCH CSS Monitoring for PDCCH Scheduling Multicast MTCH in RRC_INACTIVE:

In certain system, the Type3-PDCCH CSS is configured via unicast RRC signaling and the quasi-colocation (QCL) assumption is determined but not beam sweeping for a UE in RRC_CONNECTED mode. According to certain aspects, the Type3-PDCCH CSS with beam sweeping may be used for monitoring for PDCCH scheduling multicast MTCH in RRC_INACTIVE.

In some aspects, the Type3-PDCCH CSS with beam sweeping (e.g., the searchSpaceMTCH_Multicast) is configured by a multicast MCCH-Message-Multicast for multicast reception in RRC_INACTIVE. In some aspects, the Type3-PDCCH CSS with beam sweeping for monitoring for PDCCH scheduling multicast MTCH in RRC_INACTIVE is configured separately from the broadcast MTCH search space, also separately from the multicast MCCH search space. In some aspects, a mapping of the multicast MTCH PDCCH occasions to SSBs (e.g., MTCH-SSB-Mapping-WindowCycleOffset_Multicast) is configured for the multicast MTCH PDCCH search space.

In certain systems, such as 3GPP Release-17 5G NR systems, the Type3-PDCCH CSS supports both DCI format 4_1 and DCI format 4_2 for MTCH. For multicast MTCH, if Type3-PDCCH CSS is used (e.g., for searchSpaceMTCH_Multicast), the DCI format for multicast MTCH in RRC_INACTIVE may be restricted to only one DCI format (e.g., DCI format 4_1 only). In some aspects, the UE monitors a Type3-PDCCH CSS set configured for the MBS multicast MTCH (e.g., for searchSpaceMTCH_Multicast) for the DCI format 4_1 with the CRC scrambled by a G-RNTI for multicast.

According to certain aspects, a restriction on the CCE aggregation levels and the number of candidates per CCE aggregation level is used for the Type3-PDCCH CSS monitoring for the multicast MTCH in RRC_INACTIVE. In some aspects, the UE assumes the CCE aggregation levels and the number of candidates per CCE aggregation level in the Table 500 depicted in FIG. 5.

According to certain aspects, a restriction on the CCE aggregation levels and the number of candidates per CCE aggregation level is not used for the Type3-PDCCH CSS monitoring for the multicast MTCH in RRC_INACTIVE. In some aspects, the UE monitors unrestricted CCE aggregation levels and an unrestricted number of candidates per CCE aggregation level.

Example Operations of Entities in a Communications Network

Figure 6:
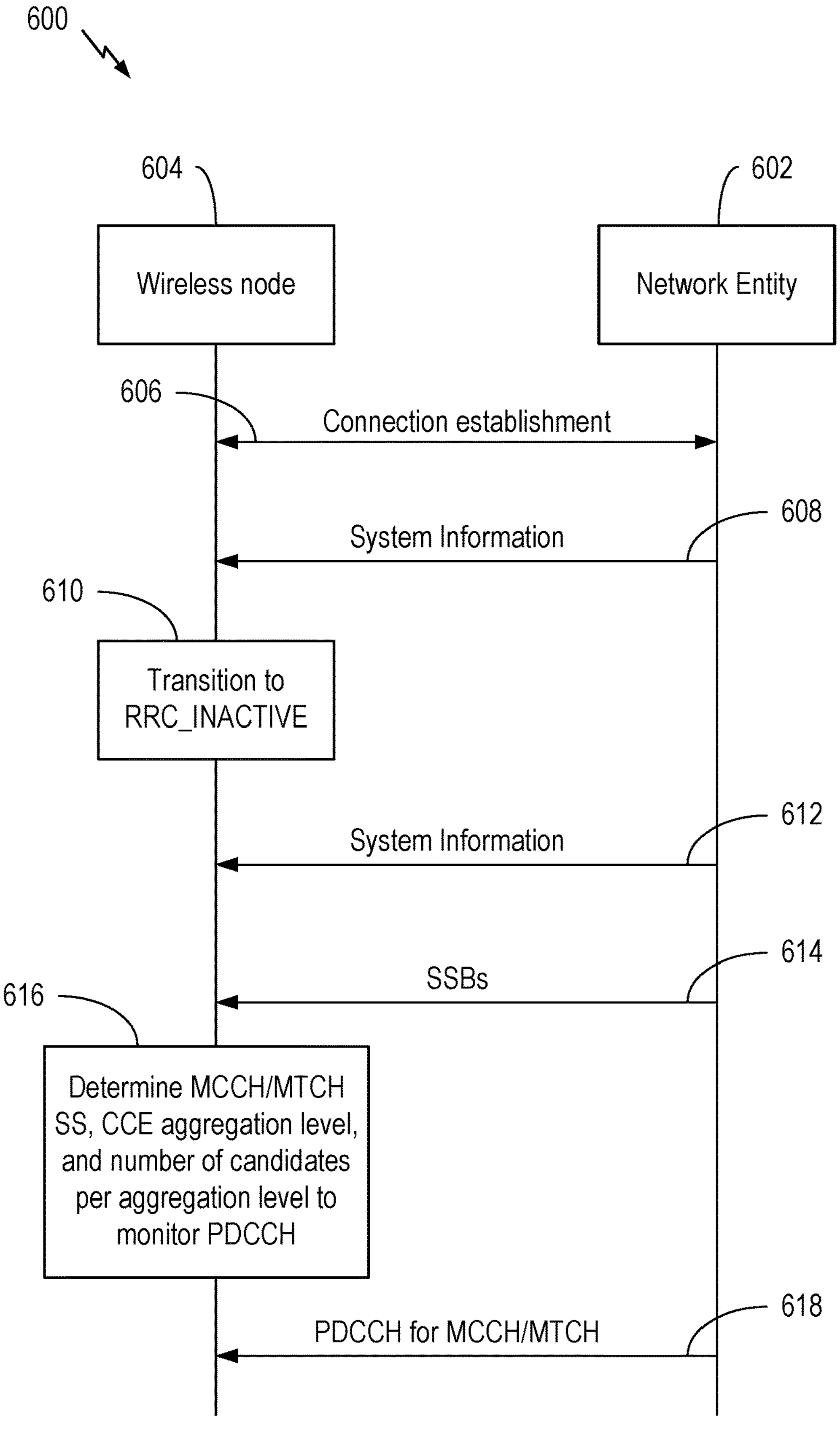
FIG. 6 depicts a process flow for communications in a network between a wireless node and a network entity.

FIG. 6 depicts a process flow 600 for communications in a network between a network entity 602, a wireless node 604. In some aspects, the network entity 602 may be an example of the BS 102 depicted and described with respect to FIGS. 1 and 3 or a disaggregated base station depicted and described with respect to FIG. 2. Similarly, the wireless node 604 may be an example of UE 104 depicted and described with respect to FIGS. 1 and 3. However, in other aspects, wireless node 604 may be another type of wireless communications device and network entity 602 may be another type of network entity or network node, such as those described herein.

As shown in FIG. 6, at step 606, the wireless node 604 and network entity 602 may establish a connection (e.g., by initial attachment). In some aspects, after establishing the connection at step 606, the wireless node 604 is an RRC_CONNECTED mode. The wireless node 604 may receive system information from the network entity at step 608. The system information may configure PDCCH search spaces for MBS broadcast and/or multicast MCCH and/or MBS broadcast and/or multicast MTCH. At step 610, the wireless node 604 may transition to an RRC_INACTIVE mode.

At step 612, the wireless node 604 receives system information from the network entity 602. The system information may configure PDCCH search spaces for MCCH and/or MTCH in the RRC_INACTIVE mode. In some aspects, the system information configures a Type0/0B-PDCCH CSS for multicast MCCH. In some aspects, the system information configures a Type0/0B/3-PDCCH CSS for multicast MCCH. In some aspects, the system information configures the Type0/0B-PDCCH CSS for the multicast MCCH for DCI format 4_0. In some aspects, the system information configures the Type0/0B/3-PDCCH CSS for the multicast MCCH for DCI format 4_1. In some aspects, the system information configures the PDCCH CSS for multicast MCCH and/or MTCH in the RRC_INACTIVE mode with beam sweeping. In some aspects, the system information is received in one or more RRC IEs, an RRC release message, and/or a SIB.

At step 616, the wireless node 604 determines the search space, CCE aggregation levels, and number of candidates per CCE aggregation level to monitor PDCCH for MCCH and/or multicast MTCH in the RRC_INACTIVE mode. In some aspects, the wireless node 604 assumes a preconfigured restricted set of CEE aggregation levels and number of candidates per CCE aggregation level (e.g., as shown in the Table 500 depicted in FIG. 5) for monitoring for the Type0/0B/3-PDCCH CSS set for the MCCH and/or MTCH in the RRC_INACTIVE mode.

At step 618, the wireless node 604 monitors for PDCCH scheduling MCCH and/or MTCH from the network entity 602 based on the search space, CEE aggregation levels, and number of candidates per CCE aggregation level determined at step 616. In some aspects, the MCCH indicates a mapping of MBS multicast MTCH PDDCH monitoring occasions to SSBs. As shown, at step 614, the network entity 602 transmits SSBs with beam sweeping to the wireless node 604. Based on the SSBs and the configured mapping, the wireless node 604 can determine the MTCH PDDCH monitoring occasions to monitor for the PDCCH for the MBS multicast MTCH.

Example Operations of a User Equipment

Figure 7:
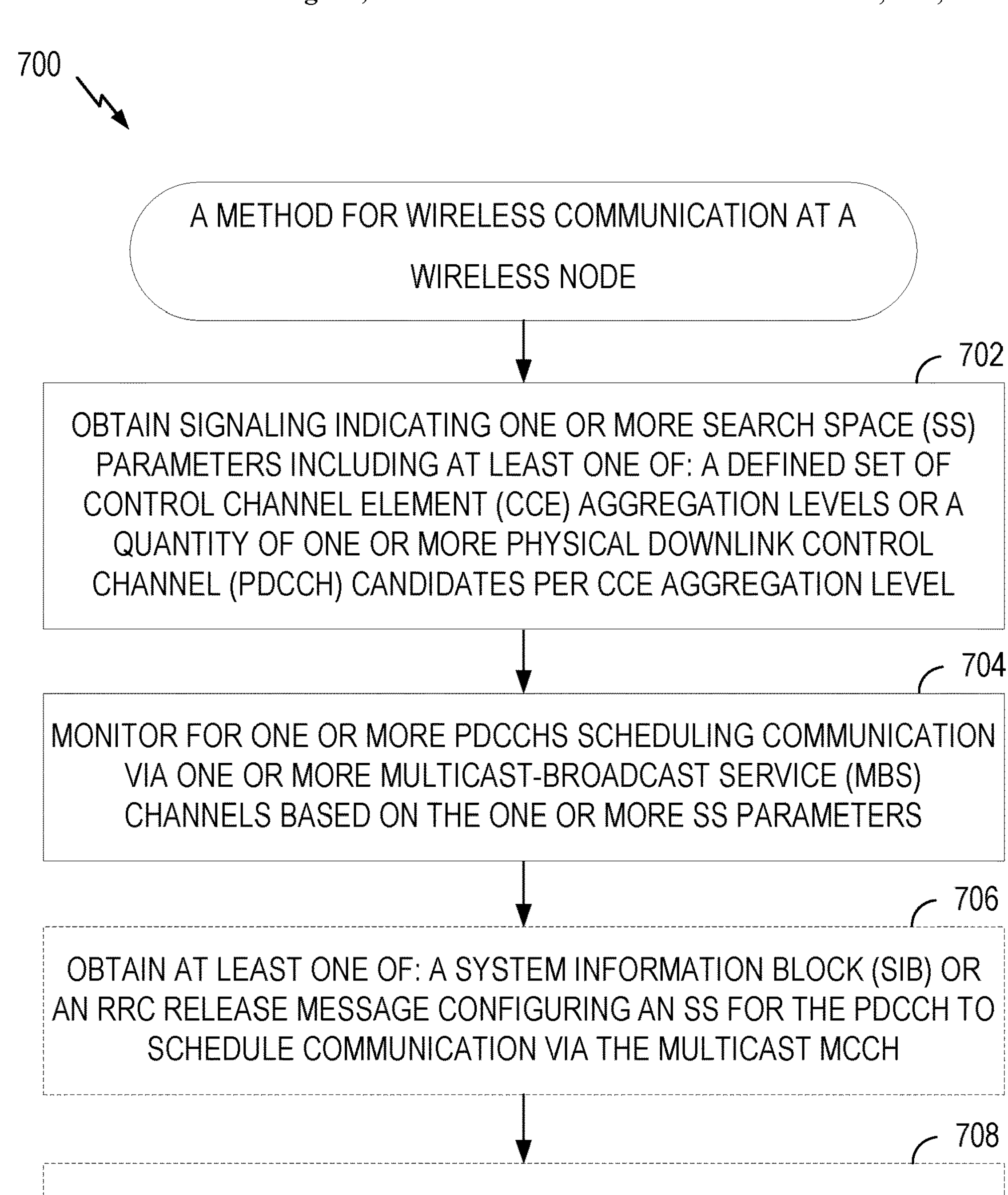
FIG. 7 depicts a method for wireless communications by a wireless node.

FIG. 7 shows a method 700 for wireless communications by a wireless node, such as a UE 104 of FIGS. 1 and 3.

Method 700 may begin, at operation 702 with obtaining signaling indicating one or more search space (SS) parameters including at least one of: a defined set of control channel element (CCE) aggregation levels or a quantity of one or more physical downlink control channel (PDCCH) candidates per CCE aggregation level.

Method 700 may proceed to operation 704 with monitoring for one or more PDCCHs scheduling communication via one or more multicast-broadcast service (MBS) channels based on the one or more SS parameters.

In some aspects, the one or more MBS channels comprise at least one of: an MBS control channel (MCCH) or an MBS traffic channel (MTCH).

In some aspects, the monitoring at operation 704 comprises monitoring for a PDCCH scheduling communication via a multicast MBS control channel (MCCH), said monitoring being performed during a radio resource control (RRC) inactive mode.

In some aspects, the method 700 further comprises, optionally, at operation 706 obtaining at least one of: a system information block (SIB) or an RRC release message configuring an SS for the PDCCH to schedule communication via the multicast MCCH.

In some aspects, the monitoring at operation 704 comprises monitoring in a Type0-PDCCH common SS (CSS) or a Type0B-PDCCH CSS for a first downlink control information (DCI) format scheduling communication via a multicast MBS control channel (MCCH).

In some aspects, the first DCI format is a DCI format 4_0.

In some aspects, the monitoring at operation 704 comprises monitoring for a PDCCH scheduling communication via a multicast MBS traffic channel (MTCH), said monitoring being performed during a radio resource control (RRC) inactive mode.

In some aspects, the method 700 further comprising, optionally, at operation 708 obtaining a MBS control channel (MCCH), wherein the MCCH comprises control information that configures a mapping of PDCCH monitoring occasions of the multicast MTCH to synchronization signal blocks (SSBs).

In some aspects, the method 700 further comprising, optionally, detecting one or more of the SSBs, wherein the monitoring comprises monitoring the PDCCH monitoring occasions of the multicast MTCH based on the mapping.

In some aspects, the method 700 further comprises, optionally, obtaining at least one of: a system information block (SIB) or an RRC release message configuring a SS, wherein the monitoring comprises monitoring in the SS for the PDCCH scheduling communication via the multicast MTCH.

In some aspects, the method 700 further comprises, optionally, monitoring another configured SS for a PDCCH scheduling communication via the multicast MTCH, said monitoring being performed during an RRC connected mode; and entering the RRC inactive mode, wherein the RRC release message configuring the SS is obtained.

In some aspects, the method 700 further comprises, optionally, monitoring in another configured SS for a PDCCH scheduling communication via the multicast MTCH, said monitoring being performed during an RRC connected mode; and entering the RRC inactive mode, wherein the monitoring comprises continuing to monitor in the other SS for the PDCCH scheduling the multicast MTCH until the SIB is obtained.

In some aspects, the monitoring at operation 704 comprises monitoring in a Type0-PDCCH common SS (CSS) or a Type0B-PDCCH CSS for a second downlink control information (DCI) format scheduling communication via the multicast MTCH.

In some aspects, the second DCI format is a DCI format 4_1 or a DCI format 4_2 for scheduling communication via the multicast MTCH.

In some aspects, the monitoring at operation 704 comprises monitoring in a Type3-PDCCH common SS (CSS)

having a third downlink control information (DCI) format for scheduling communication via the multicast MTCH.

In some aspects, the third DCI format is a DCI format 4_1 for scheduling communication via the multicast MTCH.

In some aspects, the monitoring at operation 704 comprises monitoring at least one of: PDCCH candidates of the defined set of CCE aggregation levels or the quantity of one or more PDCCH candidates per CCE aggregation level in a Type3-PDCCH CSS for the PDCCH scheduling communication via the multicast MTCH, said monitoring being performing during the RRC inactive mode.

In some aspects, the monitoring at operation 704 comprises monitoring unrestricted CCE aggregation levels and an unrestricted number of PDCCH candidates per CCE aggregation level in a Type3-PDCCH CSS for the PDCCH scheduling communication via the multicast MTCH, said monitoring being performed during the RRC inactive mode.

In some aspects, the monitoring at operation 704 comprises monitoring in a Type0B-PDCCH common SS (CSS) or a Type3-PDCCH CSS for PDCCHs scheduling communication via a broadcast MBS control channel (MCCH) and a broadcast MBS traffic channel (MTCH).

In some aspects, the monitoring at operation 704 comprises: monitoring at least one of: the defined set of CCE aggregation levels or the quantity of one or more PDCCH candidates per CCE aggregation level for the PDCCH scheduling communication via one of the broadcast MTCH and the broadcast MCCH; and monitoring unrestricted CCE aggregation levels and unrestricted number of PDCCH candidates per CCE aggregation level for the PDCCH scheduling communication via the other one of the broadcast MTCH and the broadcast MCCH.

In some aspects, the monitoring at operation 704 comprises: monitoring at least one of: the defined set of CCE aggregation levels or the quantity of one or more PDCCH candidates per CCE aggregation level for both the PDCCH scheduling communication via the broadcast MTCH and the PDCCH scheduling communication via the broadcast MCCH.

In some aspects, the monitoring at operation 704 comprises: monitoring unrestricted CCE aggregation levels and an unrestricted number of PDCCH candidates per CCE aggregation level for both a PDCCH scheduling communication via the broadcast MTCH and a PDCCH scheduling communication via the broadcast MCCH.

In some aspects, the PDCCH scheduling communication via the broadcast MBS channel is on at least one of a primary cell (PCell) or a secondary cell (SCell) during a radio resource control (RRC) connected mode.

Figure 9:
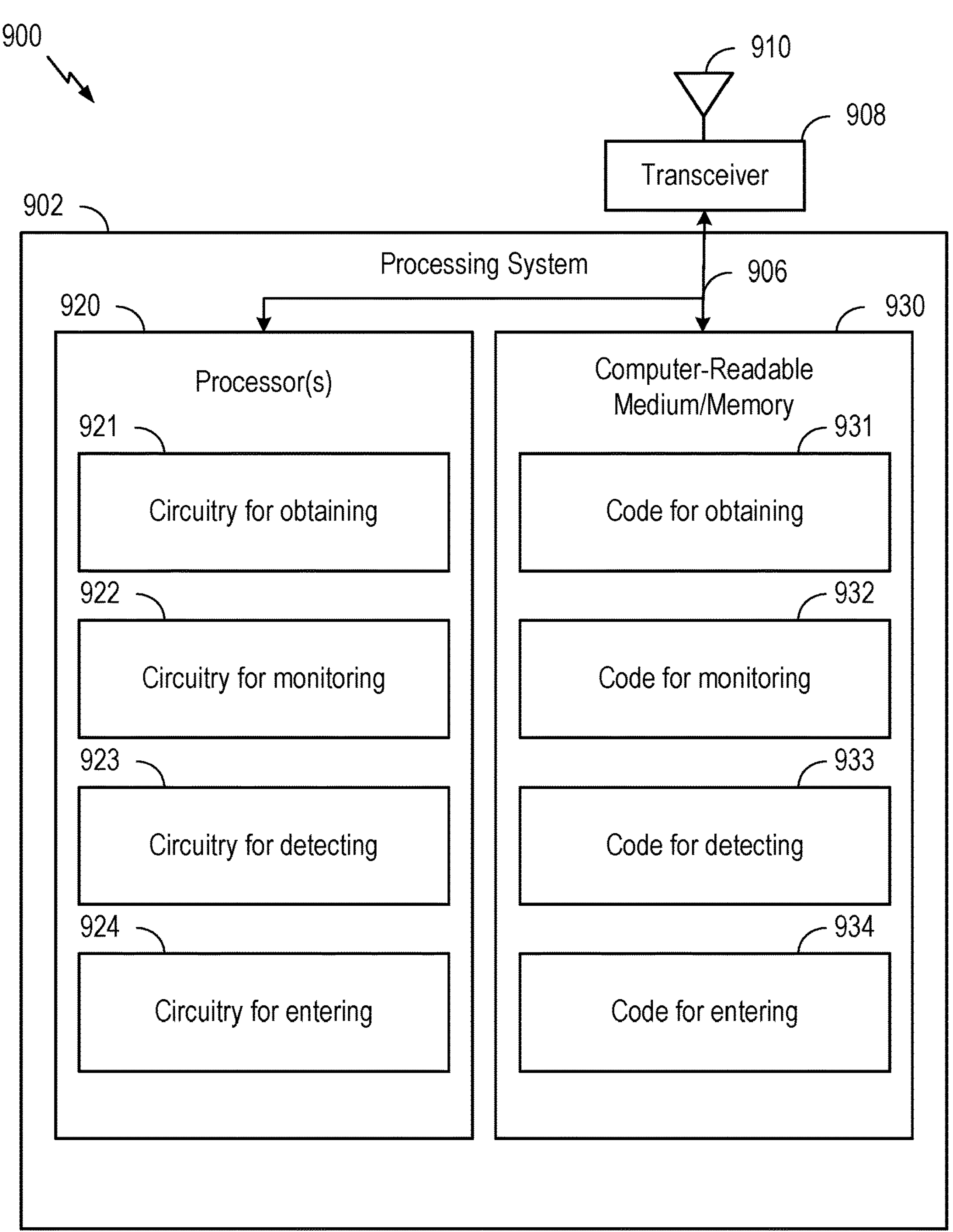
FIG. 9 depicts aspects of an example communications device.

In one aspect, method 700, or any aspect related to it, may be performed by an apparatus, such as communications device 900 of FIG. 9, which includes various components operable, configured, or adapted to perform the method 700. Communications device 900 is described below in further detail.

Note that FIG. 7 is just one example of a method, and other methods including fewer, additional, or alternative steps are possible consistent with this disclosure.

Example Operations of a Network Entity

FIG. 8 shows a method 800 for wireless communications by a network entity, such as BS 102 of FIGS. 1 and 3, or a disaggregated base station as discussed with respect to FIG. 2.

Method 800 may begin, at operation 802 with outputting signaling indicating one or more search space (SS) parameters including at least one of: a defined set of control channel element (CCE) aggregation levels or a quantity of one or more physical downlink control channel (PDCCH) candidates per CCE aggregation level.

Method 800 may proceed to operation 804 with outputting one or more PDCCHs scheduling communication via one or more multicast-broadcast service (MBS) channels based on the one or more SS parameters.

In some aspects, the one or more MBS channels comprise at least one of: an MBS control channel (MCCH) or an MBS traffic channel (MTCH).

In some aspects, the outputting at operation 804 comprises outputting a PDCCH scheduling communication via a multicast MBS control channel (MCCH), said monitoring being performed during a radio resource control (RRC) inactive mode.

In some aspects, the method 800 further comprises, optionally, at operation 806 outputting at least one of: a system information block (SIB) or an RRC release message configuring an SS for the PDCCH to schedule communication via the multicast MCCH.

In some aspects, the outputting at operation 804 comprises outputting in a Type0-PDCCH common SS (CSS) or a Type0B-PDCCH CSS a first downlink control information (DCI) format scheduling communication via a multicast MBS control channel (MCCH).

In some aspects, the first DCI format is a DCI format 4_0.

In some aspects, the outputting at operation 804 comprises outputting a PDCCH scheduling communication via a multicast MBS traffic channel (MTCH), said monitoring being performed during a radio resource control (RRC) inactive mode.

In some aspects, the method 800 further comprising, optionally, at operation 708 outputting a MBS control channel (MCCH), wherein the MCCH comprises control information that configures a mapping of PDCCH monitoring occasions of the multicast MTCH to synchronization signal blocks (SSBs).

In some aspects, the method 800 further comprises, optionally, outputting one or more of the SSBs, wherein the outputting comprises outputting the PDCCH monitoring occasions of the multicast MTCH based on the mapping.

In some aspects, the method 800 further comprises, optionally, outputting at least one of: a system information block (SIB) or an RRC release message configuring a SS, wherein the outputting comprises outputting in the SS the PDCCH scheduling communication via the multicast MTCH.

In some aspects, the method 800 further comprises, optionally, outputting in another configured SS a PDCCH scheduling communication via the multicast MTCH, said outputting being performed during an RRC connected mode; and entering the RRC inactive mode, wherein the RRC release message configuring the SS is output.

In some aspects, the method 800 further comprises, optionally, outputting in another configured SS a PDCCH scheduling communication via the multicast MTCH, said outputting being performed during an RRC connected mode; and entering the RRC inactive mode, wherein the outputting comprises outputting one or more PDCCHs in the other SS scheduling the multicast MTCH until the SIB is output.

In some aspects, the outputting at operation 804 comprises outputting in a Type0-PDCCH common SS (CSS) or a Type0B-PDCCH CSS a second downlink control information (DCI) format scheduling communication via the multicast MTCH.

In some aspects, the second DCI format is a DCI format 4_1 or a DCI format 4_2 for scheduling communication via the multicast MTCH.

In some aspects, the outputting at operation 804 comprises outputting in a Type3-PDCCH common SS (CSS) having a third downlink control information (DCI) format for scheduling communication via the multicast MTCH.

In some aspects, the third DCI format is a DCI format 4_1 for scheduling communication via the multicast MTCH.

In some aspects, the outputting at operation 804 comprises outputting at least one of: PDCCH candidates of the defined set of CCE aggregation levels or the quantity of one or more PDCCH candidates per CCE aggregation level in a Type3-PDCCH CSS for the PDCCH scheduling communication via the multicast MTCH, said outputting being performing during the RRC inactive mode.

In some aspects, the outputting at operation 804 comprises outputting unrestricted CCE aggregation levels and an unrestricted number of PDCCH candidates per CCE aggregation level in a Type3-PDCCH CSS for the PDCCH scheduling communication via the multicast MTCH, said outputting being performed during the RRC inactive mode.

In some aspects, the outputting at operation 804 comprises outputting in a Type0B-PDCCH common SS (CSS) or a Type3-PDCCH CSS for PDCCHs scheduling communication via a broadcast MBS control channel (MCCH) and a broadcast MBS traffic channel (MTCH).

In some aspects, the outputting at operation 804 comprises: outputting at least one of: the defined set of CCE aggregation levels or the quantity of one or more PDCCH candidates per CCE aggregation level for the PDCCH scheduling communication via one of the broadcast MTCH and the broadcast MCCH; and outputting unrestricted CCE aggregation levels and unrestricted number of PDCCH candidates per CCE aggregation level for the PDCCH scheduling communication via the other one of the broadcast MTCH and the broadcast MCCH.

In some aspects, the outputting at operation 804 comprises: outputting at least one of: the defined set of CCE aggregation levels or the quantity of one or more PDCCH candidates per CCE aggregation level for both the PDCCH scheduling communication via the broadcast MTCH and the PDCCH scheduling communication via the broadcast MCCH.

In some aspects, the outputting at operation 804 comprises: outputting unrestricted CCE aggregation levels and an unrestricted number of PDCCH candidates per CCE aggregation level for both a PDCCH scheduling communication via the broadcast MTCH and a PDCCH scheduling communication via the broadcast MCCH.

In some aspects, the PDCCH scheduling communication via the broadcast MBS channel is on at least one of a primary cell (PCell) or a secondary cell (SCell) during a radio resource control (RRC) connected mode.

Figure 10:
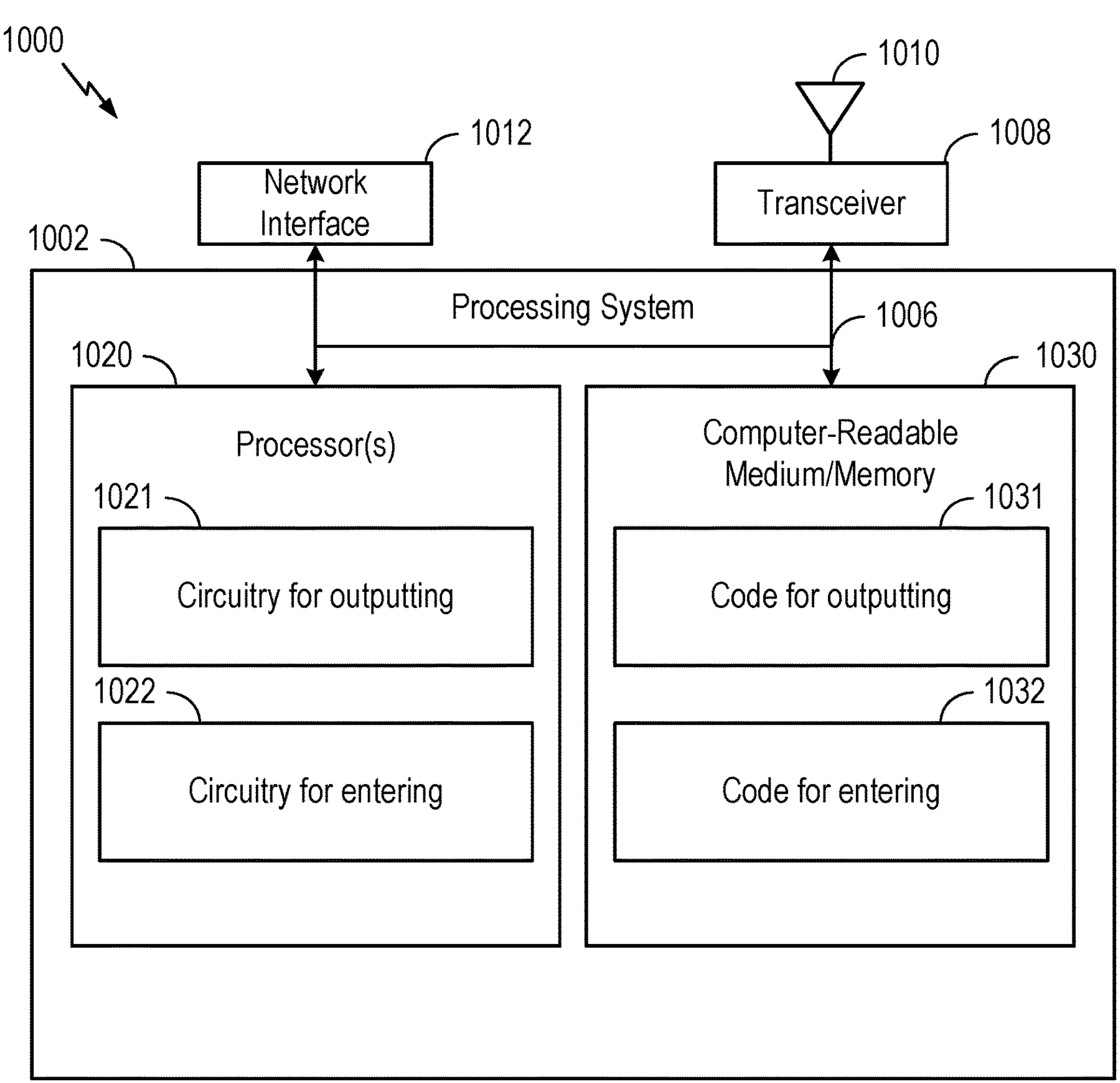
FIG. 10 depicts aspects of an example communications device.

In one aspect, method 800, or any aspect related to it, may be performed by an apparatus, such as communications device 100 of FIG. 10, which includes various components operable, configured, or adapted to perform the method 800. Communications device 900 is described below in further detail.

Note that FIG. 8 is just one example of a method, and other methods including fewer, additional, or alternative steps are possible consistent with this disclosure.

Example Communications Devices

FIG. 9 depicts aspects of an example communications device 900. In some aspects, communications device 900 is a user equipment, such as UE 104 described above with respect to FIGS. 1 and 3.

The communications device 900 includes a processing system 902 coupled to a transceiver 908 (e.g., a transmitter and/or a receiver). The transceiver 908 is configured to transmit and receive signals for the communications device 900 via an antenna 910, such as the various signals as described herein. The processing system 902 may be configured to perform processing functions for the communications device 900, including processing signals received and/or to be transmitted by the communications device 900.

The processing system 902 includes one or more processors 920. In various aspects, the one or more processors 920 may be representative of one or more of receive processor 358, transmit processor 364, TX MIMO processor 366, and/or controller/processor 380, as described with respect to FIG. 3. The one or more processors 920 are coupled to a computer-readable medium/memory 930 via a bus 906. In certain aspects, the computer-readable medium/memory 930 is configured to store instructions (e.g., computer-executable code) that when executed by the one or more processors 920, cause the one or more processors 920 to perform the method 700 described with respect to FIG. 7, or any aspect related to it. Note that reference to a processor performing a function of communications device 900 may include one or more processors performing that function of communications device 900.

In the depicted example, computer-readable medium/memory 930 stores code (e.g., executable instructions) for obtaining 931, code for monitoring 932, code for detecting 933, and code for entering 934. Processing of the code 931-934 may cause the communications device 900 to perform the method 700 described with respect to FIG. 7, or any aspect related to it.

The one or more processors 920 include circuitry configured to implement (e.g., execute) the code stored in the computer-readable medium/memory 930, including circuitry for obtaining 921, circuitry for monitoring 922, circuitry for detecting 923, and circuitry for entering 924. Processing with circuitry 921-924 may cause the communications device 900 to perform the method 700 described with respect to FIG. 7, or any aspect related to it.

Various components of the communications device 900 may provide means for performing the method 700 described with respect to FIG. 7, or any aspect related to it. For example, means for outputting for transmission, means for transmitting, or means for sending may include the transceivers 354 and/or antenna(s) 352 of the UE 104 illustrated in FIG. 3 and/or transceiver 908 and antenna 910 of the communications device 900 in FIG. 9. Means for obtaining, means for detecting, means for receiving, or means for monitoring may include the transceivers 354 and/or antenna(s) 352 of the UE 104 illustrated in FIG. 3 and/or circuitry 921, circuitry 922, circuitry 923, transceiver 908 and/or antenna 910 of the communications device 900 in FIG. 9. Means for entering may include controller/processor 380, of the UE 104 illustrated in FIG. 3 and/or circuitry 924 of the communications device 900 in FIG. 9.

FIG. 10 depicts aspects of an example communications device. In some aspects, communications device 1000 is a network entity, such as BS 102 of FIGS. 1 and 3, or a disaggregated base station as discussed with respect to FIG. 2.

The communications device 1000 includes a processing system 1002 coupled to a transceiver 1008 (e.g., a transmitter and/or a receiver) and/or a network interface 1012. The transceiver 1008 is configured to transmit and receive signals for the communications device 1000 via an antenna 1010, such as the various signals as described herein. The network interface 1012 is configured to obtain and send signals for the communications device 1000 via communications link(s), such as a backhaul link, midhaul link, and/or fronthaul link as described herein, such as with respect to FIG. 2. The processing system 1002 may be configured to perform processing functions for the communications device 1000, including processing signals received and/or to be transmitted by the communications device 1000.

The processing system 1002 includes one or more processors 1020. In various aspects, one or more processors 1020 may be representative of one or more of receive processor 338, transmit processor 320, TX MIMO processor 330, and/or controller/processor 340, as described with respect to FIG. 3. The one or more processors 1020 are coupled to a computer-readable medium/memory 1030 via a bus 1006. In certain aspects, the computer-readable medium/memory 1030 is configured to store instructions (e.g., computer-executable code) that when executed by the one or more processors 1020, cause the one or more processors 1020 to perform the method 800 described with respect to FIG. 8, or any aspect related to it. Note that reference to a processor of communications device 1000 performing a function may include one or more processors of communications device 1000 performing that function.

In the depicted example, the computer-readable medium/memory 1030 stores code (e.g., executable instructions) for outputting 1031 and code for entering 1032. Processing of the code 1031-1032 may cause the communications device 1000 to perform the method 800 described with respect to FIG. 8, or any aspect related to it.

The one or more processors 1020 include circuitry configured to implement (e.g., execute) the code stored in the computer-readable medium/memory 1030, including circuitry for outputting 1021 and circuitry for entering 1022. Processing with circuitry 1021-1022 may cause the communications device 1000 to perform the method 800 as described with respect to FIG. 8, or any aspect related to it.

Various components of the communications device 1000 may provide means for performing the method 800 as described with respect to FIG. 8, or any aspect related to it. Means for transmitting, sending or outputting for transmission may include the transceivers 332 and/or antenna(s) 334 of the BS 102 illustrated in FIG. 3 and/or circuitry 1021, transceiver 1008 and antenna 1010 of the communications device 1000 in FIG. 10. Means for receiving or obtaining may include the transceivers 332 and/or antenna(s) 334 of the BS 102 illustrated in FIG. 3 and/or transceiver 1008 and antenna 1010 of the communications device 1000 in FIG. 10. Means for entering may include controller/processor 340 of the UE 104 illustrated in FIG. 3 and/or circuitry 1022 of the communications device 900 in FIG. 9.

Example Clauses

Implementation examples are described in the following numbered clauses.

Clause 1: A method for wireless communication at a wireless node, the method comprising: obtaining signaling indicating one or more search space (SS) parameters including at least one of: a defined set of control channel element (CCE) aggregation levels or a quantity of one or more physical downlink control channel (PDCCH) candidates per CCE aggregation level; and monitoring for one or more PDCCHs scheduling communication via one or more multicast-broadcast service (MBS) channels based on the one or more SS parameters.

Clause 2: The method of Clause 1, wherein the one or more MBS channels comprise at least one of: an MBS control channel (MCCH) or an MBS traffic channel (MTCH).

Clause 3: The method of any combination of Clauses 1-2, wherein the monitoring comprises monitoring for a PDCCH scheduling communication via a multicast MBS control channel (MCCH), said monitoring being performed during a radio resource control (RRC) inactive mode.

Clause 4: The method of Clause 3, further comprising obtaining at least one of: a system information block (SIB) or an RRC release message configuring an SS for the PDCCH to schedule communication via the multicast MCCH.

Clause 5: The method of any combination of Clauses 1-4, wherein the monitoring comprises monitoring in a Type0-PDCCH common SS (CSS) or a Type0B-PDCCH CSS for a first downlink control information (DCI) format scheduling communication via a multicast MBS control channel (MCCH).

Clause 6: The method of Clause 5, wherein the first DCI format is a DCI format 4_0.

Clause 7: The method of any combination of Clauses 1-6, wherein the monitoring comprises monitoring for a PDCCH scheduling communication via a multicast MBS traffic channel (MTCH), said monitoring being performed during a radio resource control (RRC) inactive mode.

Clause 8: The method of Clause 7, further comprising obtaining a MBS control channel (MCCH), wherein the MCCH comprises control information that configures a mapping of PDCCH monitoring occasions of the multicast MTCH to synchronization signal blocks (SSBs).

Clause 9: The method of Clause 8, further comprising detecting one or more of the SSBs, wherein the monitoring comprises monitoring the PDCCH monitoring occasions of the multicast MTCH based on the mapping.

Clause 10: The method of any combination of Clauses 7-9, further comprising obtaining at least one of: a system information block (SIB) or an RRC release message configuring a SS, wherein the monitoring comprises monitoring in the SS for the PDCCH scheduling communication via the multicast MTCH.

Clause 11: The method of Clause 10, further comprising: monitoring another configured SS for a PDCCH scheduling communication via the multicast MTCH, said monitoring being performed during an RRC connected mode; and entering the RRC inactive mode, wherein the RRC release message configuring the SS is obtained.

Clause 12: The method of any combination of Clauses 10-11, further comprising: monitoring in another configured SS for a PDCCH scheduling communication via the multicast MTCH, said monitoring being performed during an RRC connected mode; and entering the RRC inactive mode, wherein the monitoring comprises continuing to monitor in the other SS for the PDCCH scheduling the multicast MTCH until the SIB is obtained.

Clause 13: The method of any combination of Clauses 7-12, wherein the monitoring comprises monitoring in a Type0-PDCCH common SS (CSS) or a Type0B-PDCCH CSS for a second downlink control information (DCI) format scheduling communication via the multicast MTCH.

Clause 14: The method of Clause 13, wherein the second DCI format is a DCI format 4_1 or a DCI format 4_2 for scheduling communication via the multicast MTCH.

Clause 15: The method of any combination of Clauses 7-14, wherein the monitoring comprises monitoring in a Type3-PDCCH common SS (CSS) having a third downlink control information (DCI) format for scheduling communication via the multicast MTCH.

Clause 16: The method of Clause 15, wherein the third DCI format is a DCI format 4_1 for scheduling communication via the multicast MTCH.

Clause 17: The method of any combination of Clauses 15-16, wherein the monitoring comprises monitoring at least one of: PDCCH candidates of the defined set of CCE aggregation levels or the quantity of one or more PDCCH candidates per CCE aggregation level in a Type3-PDCCH CSS for the PDCCH scheduling communication via the multicast MTCH, said monitoring being performing during the RRC inactive mode.

Clause 18: The method of any combination of Clauses 15-17, wherein the monitoring comprises monitoring unrestricted CCE aggregation levels and an unrestricted number of PDCCH candidates per CCE aggregation level in a Type3-PDCCH CSS for the PDCCH scheduling communication via the multicast MTCH, said monitoring being performed during the RRC inactive mode.

Clause 19: The method of any combination of Clauses 1-18, wherein the monitoring comprises monitoring in a Type0B-PDCCH common SS (CSS) or a Type3-PDCCH CSS for PDCCHs scheduling communication via a broadcast MBS control channel (MCCH) and a broadcast MBS traffic channel (MTCH).

Clause 20: The method of Clause 19, wherein the monitoring comprises: monitoring at least one of: the defined set of CCE aggregation levels or the quantity of one or more PDCCH candidates per CCE aggregation level for the PDCCH scheduling communication via one of the broadcast MTCH and the broadcast MCCH; and monitoring unrestricted CCE aggregation levels and unrestricted number of PDCCH candidates per CCE aggregation level for the PDCCH scheduling communication via the other one of the broadcast MTCH and the broadcast MCCH.

Clause 21: The method of any combination of Clauses 19-20, wherein the monitoring comprises: monitoring at least one of: the defined set of CCE aggregation levels or the quantity of one or more PDCCH candidates per CCE aggregation level for both the PDCCH scheduling communication via the broadcast MTCH and the PDCCH scheduling communication via the broadcast MCCH.

Clause 22: The method of any combination of Clauses 19-21, wherein the monitoring comprises: monitoring unrestricted CCE aggregation levels and an unrestricted number of PDCCH candidates per CCE aggregation level for both a PDCCH scheduling communication via the broadcast MTCH and a PDCCH scheduling communication via the broadcast MCCH.

Clause 23: The method of any combination of Clauses 19-22, wherein the PDCCH scheduling communication via the broadcast MBS channel is on at least one of a primary cell (PCell) or a secondary cell (SCell) during a radio resource control (RRC) connected mode.

Clause 24: A method for wireless communication at a network entity, the method comprising: outputting for transmission signaling indicating one or more search space (SS) parameters including at least one of: a defined set of control channel element (CCE) aggregation levels or a quantity of one or more physical downlink control channel (PDCCH) candidates per CCE aggregation level; and outputting for transmission one or more PDCCHs scheduling one or more multicast-broadcast service (MBS) channels based on the one or more SS parameters.

Clause 25: The method of Clause 24, wherein the one or more MBS channels comprise at least one of: an MBS control channel (MCCH) or an MBS traffic channel (MTCH).

Clause 26: The method of any combination of Clauses 24-25, wherein the outputting comprises outputting a PDCCH scheduling communication via a multicast MBS control channel (MCCH), said monitoring being performed during a radio resource control (RRC) inactive mode.

Clause 27: The method of Clause 26, further comprising outputting at least one of: a system information block (SIB) or an RRC release message configuring an SS for the PDCCH to schedule communication via the multicast MCCH.

Clause 28: The method of any combination of Clauses 24-27, wherein the outputting comprises outputting in a Type0-PDCCH common SS (CSS) or a Type0B-PDCCH CSS a first downlink control information (DCI) format scheduling communication via a multicast MBS control channel (MCCH).

Clause 29: The method of Clause 28, wherein the first DCI format is a DCI format 4_0.

Clause 30: The method of any combination of Clauses 24-29, wherein the outputting comprises outputting a PDCCH scheduling communication via a multicast MBS traffic channel (MTCH), said monitoring being performed during a radio resource control (RRC) inactive mode.

Clause 31: The method of Clause 30, further comprising outputting a MBS control channel (MCCH), wherein the MCCH comprises control information that configures a mapping of PDCCH monitoring occasions of the multicast MTCH to synchronization signal blocks (SSBs).

Clause 32: The method of Clause 31, further comprising outputting one or more of the SSBs, wherein the outputting the PDCCH scheduling communication via the multicast MTCH comprises outputting the PDCCH in one or more of the monitoring occasions of the multicast MTCH based on the mapping.

Clause 33: The method of any combination of Clauses 30-32, further comprising outputting at least one of: a system information block (SIB) or an RRC release message configuring a SS, wherein the outputting the PDCCH scheduling communication via the multicast MTCH comprises outputting in the SS the PDCCH scheduling communication via the multicast MTCH.

Clause 34: The method of Clause 33, further comprising: outputting in another configured SS a PDCCH scheduling communication via the multicast MTCH, said outputting being performed during an RRC connected mode; and entering the RRC inactive mode, wherein the RRC release message configuring the SS is output.

Clause 35: The method of any combination of Clauses 33-34, further comprising: outputting in another configured SS a PDCCH scheduling communication via the multicast MTCH, said outputting being performed during an RRC connected mode; and entering the RRC inactive mode, wherein the outputting comprises outputting in the other SS the PDCCH scheduling the multicast MTCH until the SIB is output.

Clause 36: The method of any combination of Clauses 30-35, wherein the outputting comprises outputting in a Type0-PDCCH common SS (CSS) or a Type0B-PDCCH CSS a second downlink control information (DCI) format scheduling communication via the multicast MTCH.

Clause 37: The method of Clause 36, wherein the second DCI format is a DCI format 4_1 or a DCI format 4_2 for scheduling communication via the multicast MTCH.

Clause 38: The method of any combination of Clauses 30-37, wherein the outputting comprises outputting in a Type3-PDCCH common SS (CSS) having a third downlink control information (DCI) format for scheduling communication via the multicast MTCH.

Clause 39: The method of Clause 38, wherein the third DCI format is a DCI format 4_1 for scheduling communication via the multicast MTCH.

Clause 40: The method of any combination of Clauses 38-39, wherein the outputting comprises outputting PDCCH of the defined set of CCE aggregation levels in a Type3-PDCCH CSS for the PDCCH scheduling communication via the multicast MTCH, said outputting being performing during the RRC inactive mode.

Clause 41: The method of any combination of Clauses 24-40, wherein the outputting comprises outputting in a Type0B-PDCCH common SS (CSS) or a Type3-PDCCH CSS one or more PDCCHs scheduling communication via a broadcast MBS control channel (MCCH) and a broadcast MBS traffic channel (MTCH).

Clause 42: The method of Clause 41, wherein the outputting comprises: outputting PDCCH of the defined set of CCE aggregation levels for the PDCCH scheduling communication via one of the broadcast MTCH and the broadcast MCCH; and outputting PDCCH of unrestricted CCE aggregation levels for the PDCCH scheduling communication via the other one of the broadcast MTCH and the broadcast MCCH.

Clause 43: The method of any combination of Clauses 41-42, wherein the outputting comprises: outputting PDCCH of the defined set of CCE aggregation levels for both the PDCCH scheduling communication via the broadcast MTCH and the PDCCH scheduling communication via the broadcast MCCH.

Clause 44: The method of any combination of Clauses 41-43, wherein the outputting comprises: outputting PDCCH of unrestricted CCE aggregation levels for both a PDCCH scheduling communication via the broadcast MTCH and a PDCCH scheduling communication via the broadcast MCCH.

Clause 45: The method of any combination of Clauses 41-44, wherein the PDCCH scheduling communication via the broadcast MBS channel is on at least one of a primary cell (PCell) or a secondary cell (SCell) during a radio resource control (RRC) connected mode.

Clause 46: A wireless node, comprising: a memory comprising computer-executable instructions and one or more processors configured to execute the executable instructions, the computer-executable instructions executable to cause the wireless node to perform a method in accordance with any one of Clauses 1-45.

Clause 47: An apparatus, comprising means for performing a method in accordance with any one of Clauses 1-45.

Clause 48: A non-transitory computer-readable medium comprising executable instructions that, when executed by one or more processors of an apparatus, cause the apparatus to perform a method in accordance with any one of Clauses 1-45.

Clause 49: A computer program product embodied on a computer-readable storage medium comprising code for performing a method in accordance with any one of Clauses 1-45.

Clause 50: A wireless node, comprising: at least one transceiver; a memory comprising instructions; and one or more processors configured to execute the instructions and cause the wireless node to perform a method in accordance with any one of Clauses 1-23.

Clause 50: A network entity, comprising: at least one transceiver; a memory comprising instructions; and one or more processors configured to execute the instructions and cause the network entity to perform a method in accordance with any one of Clauses 24-45

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, "a processor," "at least one processor" or "one or more processors" generally refers to a single processor configured to perform one or multiple operations or multiple processors configured to collectively perform one or more operations. In the case of multiple processors, performance of the one or more operations could be divided amongst different processors, though one processor may perform multiple operations, and multiple processors could collectively perform a single operation. Similarly, "a memory," "at least one memory" or "one or more memories" generally refers to a single memory configured to store data and/or instructions, multiple memories configured to collectively store data and/or instructions.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communication, comprising:
at least one transceiver;
one or more memories comprising computer-executable instructions; and
one or more processors configured to execute the computer-executable instructions to cause the apparatus to:
receive, via the at least one transceiver, signaling being indicative of a common search space (CSS) associated with one or more physical downlink control channels (PDCCHs) being indicative of a communication via one or more multicast multicast-broadcast service (MBS) channels; and
monitor, during a radio resource control (RRC) inactive mode and via the at least one transceiver, in the CSS for the one or more PDCCHs.

2. The apparatus of claim 1, wherein the one or more multicast MBS channels comprise at least one of: a multicast MBS control channel (MCCH) or a multicast MBS traffic channel (MTCH).

3. The apparatus of claim 2, wherein to receive the signaling the one or more processors are configured to cause the apparatus to receive at least one of: a system information block (SIB) or an RRC release message configuring the CSS, and wherein the one or more multicast MBS channels comprise the multicast MCCH.

4. The apparatus of claim 2, wherein the CSS comprises a Type0-PDCCH CSS or a Type0B-PDCCH CSS.

5. The apparatus of claim 4, wherein to monitor in the CSS, the one or more processors are configured to cause the apparatus to monitor in the Type0-PDCCH CSS or the Type0B-PDCCH CSS for the one or more PDCCHs comprising a downlink control information (DCI) format 4_0 indicative of the communication via the multicast MCCH.

6. The apparatus of claim 3, wherein the one or more processors are further configured to execute the computer-executable instructions to cause the apparatus to receive, via the at least one transceiver, the multicast MCCH, and wherein the multicast MCCH comprises control information being indicative of a mapping of PDCCH monitoring occasions for the multicast MTCH to synchronization signal blocks (SSBs).

7. The apparatus of claim 6, wherein the one or more processors are further configured to execute the computer-executable instructions cause the apparatus to detect one or more of the SSBs, wherein to monitor in the CSS, the one or more processors are configured to cause the apparatus to monitor in the CSS during the PDCCH monitoring occasions of the multicast MTCH based on the mapping.

8. The apparatus of claim 2, wherein to receive the signaling the one or more processors are configured to cause the apparatus to receive at least one of: a system information block (SIB) or an RRC release message being indicative of a configuration of the CSS, and wherein the one or more multicast channels comprise the multicast MTCH.

9. The apparatus of claim 8, wherein the one or more processors are further configured to execute the computer-executable instructions to cause the apparatus to:
monitor another search space for a PDCCH being indicative of a communication via the multicast MTCH, said monitoring being performed during an RRC connected mode; and
enter the RRC inactive mode after monitoring during the RRC connected mode, wherein the RRC release message is received.

10. The apparatus of claim 8, wherein the one or more processors are further configured to execute the computer-executable instructions to cause the apparatus to:
monitor in another search space for a PDCCH being indicative of a communication via the multicast MTCH, said monitoring being performed during an RRC connected mode; and
enter the RRC inactive mode after monitoring during the RRC connected mode, wherein to monitor the one or more PDCCHs, the one or more processors are configured to cause the apparatus to continue to monitor in the other search space for the one or more PDCCHs being indicative of the communication via the multicast MTCH until the SIB is received.

11. The apparatus of claim 1, wherein, to monitor in the CSS the, one or more processors are configured to cause the apparatus to monitor in a Type0-PDCCH CSS or a Type0B-PDCCH CSS for the one or more PDCCHs comprising is a downlink control information (DCI) format 4_1.

12. The apparatus of claim 1, wherein, to monitor in the CSS, the one or more processors are configured to cause the apparatus to monitor at least one of: PDCCH candidates of a defined set of control channel element (CCE) aggregation levels or a quantity of one or more PDCCH candidates per CCE aggregation level for the PDCCH.

13. The apparatus of claim 1, wherein, to monitor in the CSS, the one or more processors are configured to cause the apparatus to monitor unrestricted control channel element (CCE) aggregation levels and an unrestricted number of PDCCH candidates per CCE aggregation level.

14. An apparatus for wireless communication of claim 1, comprising:

at least one transceiver;

one or more memories comprising computer-executable instructions; and one or more processors configured to execute the computer-executable instructions to cause the apparatus to:

receive, via the at least one transceiver, signaling being indicative of a configuration of a Type0B physical downlink control channel (PDCCH) common search space (CSS) associated with one or more PDCCHs being indicative of communications via a multicast-broadcast service (MBS) control channel (MCCH) and a MBS traffic channel (MTCH); and monitor, in the Type0B-PDCCH CSS, unrestricted control channel element (CCE) aggregation levels for the one or more PDCCHs being indicative of the communications via the MTCH and the MCCH.

15. The apparatus of claim 14, wherein the MCCH is a broadcast MCCH on at least one of a primary cell (PCell) or a secondary cell (SCell) during a radio resource control (RRC) connected mode.

16. The apparatus of claim 1, wherein the apparatus is configured to operate as a user equipment (UE).

17. A method for wireless communication by a wireless node, the method comprising:

receiving signaling being indicative of a common search space (CSS) associated with one or more physical downlink control channels (PDCCHs) being indicative of a communication via one or more multicast multicast-broadcast service (MBS) channels; and monitoring, during a radio resource control (RRC) inactive mode, in the CSS for the one or more PDCCHs.

18. An apparatus for wireless communication, comprising:

at least one transceiver;

one or more memories comprising computer-executable instructions; and one or more processors configured to execute the computer-executable instructions to cause the apparatus to:

transmit, via the at least one transceiver, signaling being indicative of a common search space (CSS) associated with one or more physical downlink control channels (PDCCHs) being indicative of one or more multicast multicast-broadcast service (MBS) channels; and transmit, during a radio resource control (RRC) inactive mode and via the at least one transceiver, the one or more PDCCHs in the CSS.

19. The apparatus of claim 18, wherein the one or more multicast MBS channels comprise at least one of: a multicast MBS control channel (MCCH) or a multicast MBS traffic channel (MTCH).

20. The apparatus of claim 18, wherein the signaling comprises at least one of: a system information block (SIB) or an RRC release message.

21. The apparatus of claim 18, wherein the apparatus is configured to operate as a network entity.

22. The method of claim 17, wherein the one or more multicast MBS channels comprises at least one of: a multicast MBS control channel (MCCH) or a multicast MBS traffic channel (MTCH).

23. The method of claim 22, wherein receiving the signaling comprises receiving at least one of: a system information block (SIB) or an RRC release message being indicative of a configuration of the CSS, wherein the one or more MBS channels comprises the multicast MCCH.

24. The method of claim 22, wherein the CSS comprises a Type0-PDCCH CSS or a Type0B-PDCCH CSS.

25. The method of claim 24, wherein monitoring in the CSS comprises monitoring in the Type0-PDCCH CSS or the Type0B-PDCCH CSS for the one or more PDCCHs comprising a downlink control information (DCI) format 4_0, wherein the one or more MBS channels comprises the multicast MCCH.

26. The method of claim 22, further comprising receiving the multicast MCCH, wherein the multicast MCCH comprises control information being indicative of a mapping of PDCCH monitoring occasions for the multicast MTCH to synchronization signal blocks (SSBs).

27. The method of claim 26, further comprising detecting one or more of the SSBs, wherein monitoring in the CSS comprises monitoring the PDCCH monitoring occasions of the multicast MTCH based on the mapping.

28. The method of claim 22, wherein receiving the signaling comprises receiving at least one of: a system information block (SIB) or an RRC release message being indicative of a configuration of the CSS, and wherein the one or more MBS channels comprises the multicast MTCH.

29. The method of claim 28, further comprising:

monitoring another configured search space for a PDCCH being indicative of a communication via the multicast MTCH, said monitoring being performed during an RRC connected mode; and entering the RRC inactive mode after monitoring during the RRC connected mode, wherein the RRC release message is received.

30. The method of claim 28, further comprising:

monitoring in another configured search space for a PDCCH being indicative of a communication via the multicast MTCH, said monitoring being performed during an RRC connected mode; and entering the RRC inactive mode after monitoring during the RRC connected mode, wherein monitoring in the CSS comprises continuing to monitor in the other search space for the PDCCH being indicative of the multicast MTCH until the SIB is obtained.

* * * * *